US008286441B2

(12) United States Patent
Simka

(10) Patent No.: US 8,286,441 B2
(45) Date of Patent: Oct. 16, 2012

(54) SYSTEM FOR COLLECTING AND DELIVERING SOLAR AND GEOTHERMAL HEAT ENERGY WITH THERMOELECTRIC GENERATOR

(76) Inventor: Pavel Simka, Klatovy (CZ)

( * ) Notice: Subject to any disclaimer, the term of this patent is extended or adjusted under 35 U.S.C. 154(b) by 888 days.

(21) Appl. No.: 12/375,905

(22) PCT Filed: Jul. 1, 2007

(86) PCT No.: PCT/CZ2007/000066
§ 371 (c)(1),
(2), (4) Date: Jan. 30, 2009

(87) PCT Pub. No.: WO2008/014726
PCT Pub. Date: Feb. 7, 2008

(65) Prior Publication Data
US 2009/0308566 A1    Dec. 17, 2009

(30) Foreign Application Priority Data

Jul. 31, 2006  (CZ) .............................. PV 2006-488
May 2, 2007   (CZ) .............................. PV 2007-320

(51) Int. Cl.
*F25D 23/12* (2006.01)
(52) U.S. Cl. ........................................ 62/250; 62/238.2
(58) Field of Classification Search ................ 62/238.1, 62/238.2, 498; 165/45, 53
See application file for complete search history.

(56) References Cited

U.S. PATENT DOCUMENTS 3,167,926 A * 2/1965 Wepfer et al. ................. 136/204
2005/0087221 A1   4/2005 Shah

FOREIGN PATENT DOCUMENTS

DE      30 39 289 A1      5/1982
WO   WO 2005/028861 A1   3/2005
* cited by examiner

*Primary Examiner* — Melvin Jones
(74) *Attorney, Agent, or Firm* — Hovey Williams LLP

(57) ABSTRACT

The system for collecting and delivering heat energy with modular heating and cooling apparatus includes of at least one collecting body (20) of belt (94) or plate (95) construction with lateral tubing connection (31) installed within the exterior of the house (1) within the soil trench (3), where the lay-out of axes (98) of more than one soil trench (3) is radial and/or the lay-out of the axes (98) of the trenches (3) is parallel and/or trapezoidal, the system for collecting heat energy also includes the module of controlled ventilation of the house with a soil-air exchanger (19), a module for collecting of solar radiation by collectors (6, 63, 7, 60), where the system for collecting and delivering heat energy includes at least one heat transfer body (70) of a belt (94) or plate (95) construction with lateral tubing connection (69) installed within the interior of the house (1) on the surface of the walls, ceiling, floors and/or within the sub-surface construction, where the equipment (2) is located outside and the equipment (23) is located within the interior of the house (1) and where the heat energy of at least one condenser (100) and/or at least one evaporator (99) of modular heating and cooling apparatus is used for the production of electricity in the electric generator module on top of the heating and cooling functions.

21 Claims, 11 Drawing Sheets

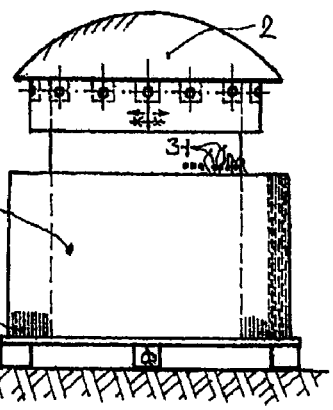
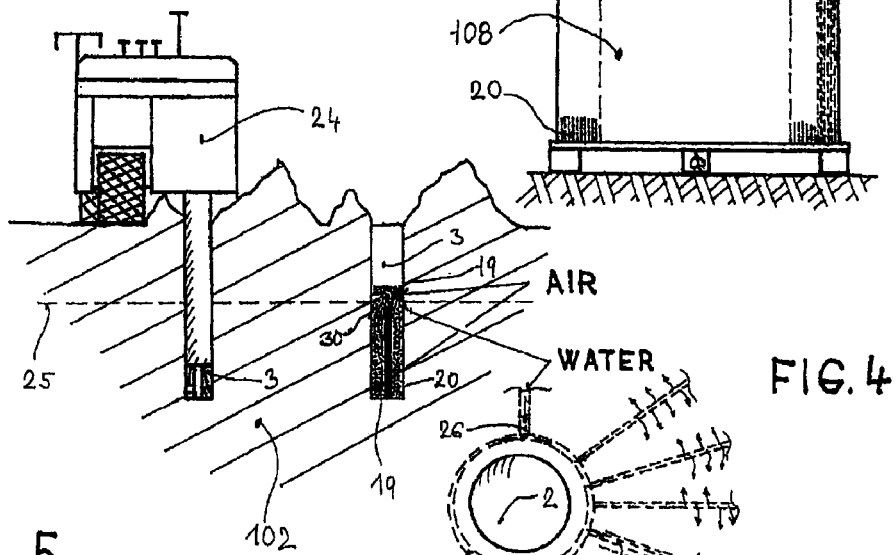
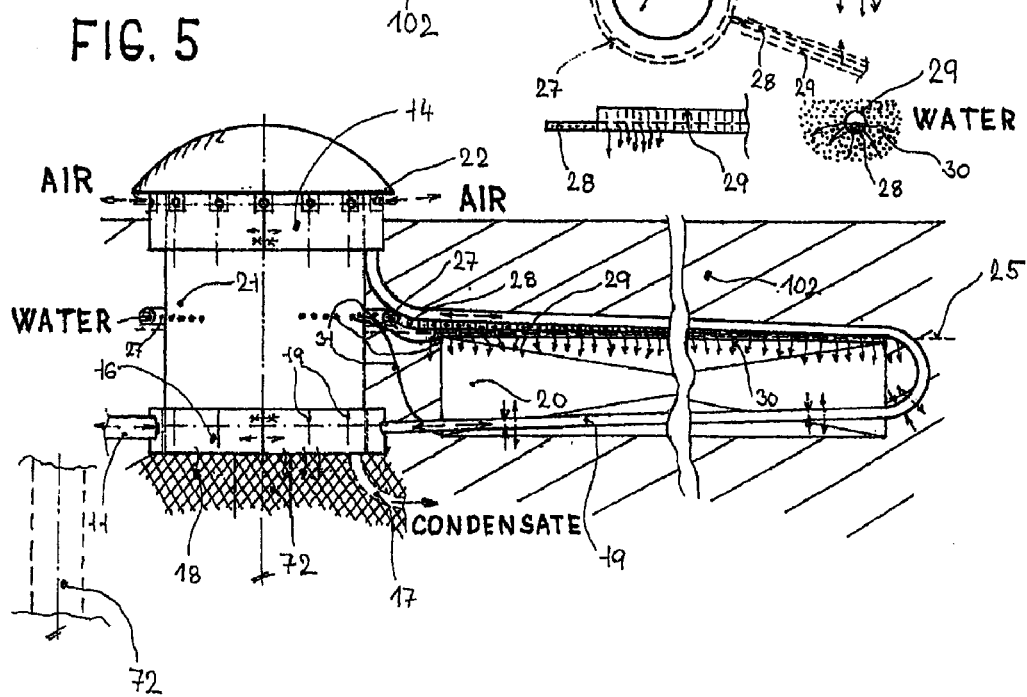

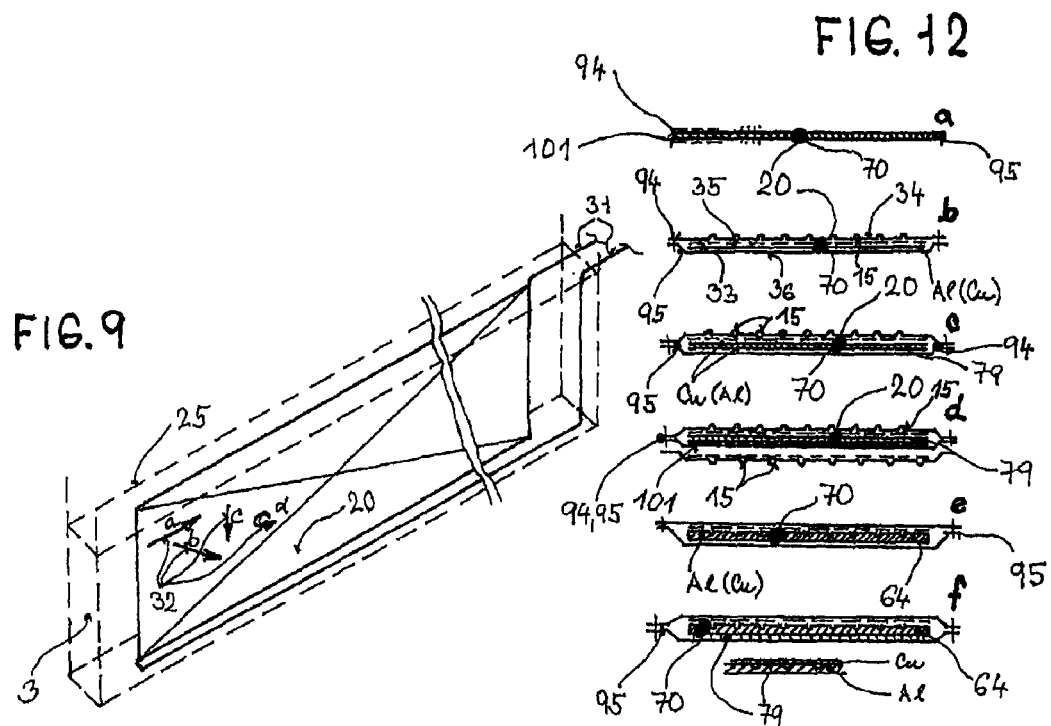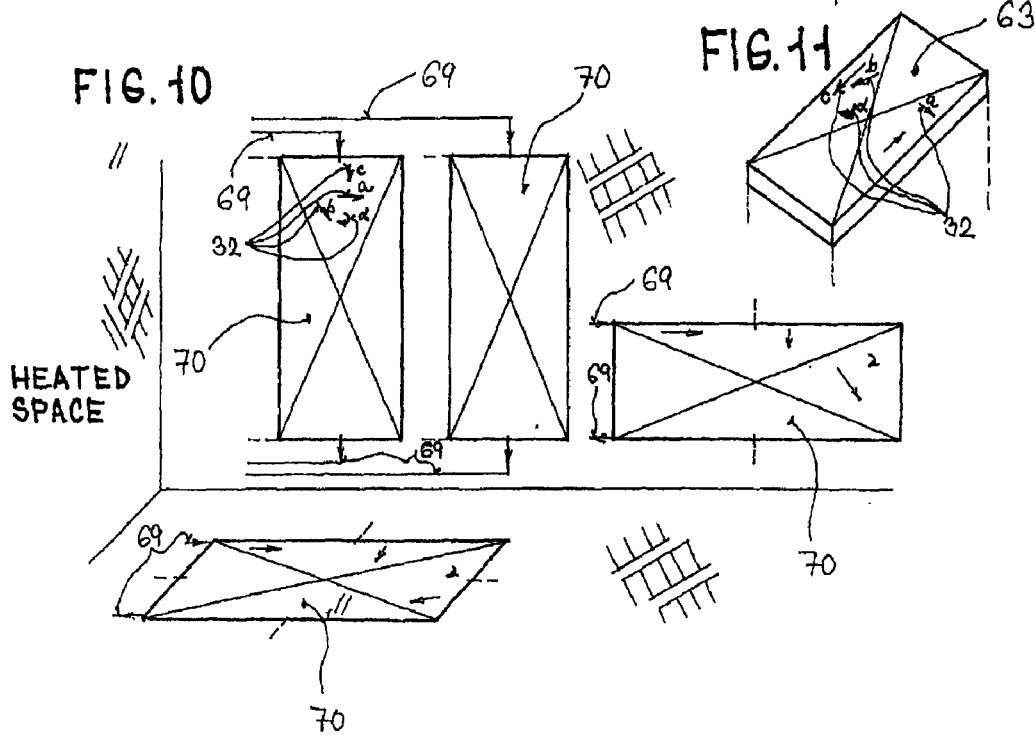

SYSTEM FOR COLLECTING AND DELIVERING SOLAR AND GEOTHERMAL HEAT ENERGY WITH THERMOELECTRIC GENERATOR

This application claims priority to PCT International Application No. PCT/CZ2007/000066, filed Jul. 1, 2007, which claims priority to Czech Republic Patent Application No. PV 2006-488, filed Jul. 31, 2006, and Czech Republic Patent Application No. PV 2007-320, filed May 2, 2007. Each of these priority applications is expressly incorporated by reference herein in its entirety.

TECHNICAL FIELD

The submitted resolution concerns the system for collecting and delivering heat energy with modular heating and cooling apparatus for the heating and cooling of homes, apartments and other houses using at least one compressor. The apparatus is equipped with a plate and/or belt system of collection and/or transfer of heat energy. The heating and cooling apparatus or the heat pump can be expanded by optional above-standard modules thereby making up the modular energetic equipment. The main source of primary energy is the low-potential heat contained in the subsurface layers of the ground. The system also allows for the collection of energy in surface environments with the opportunity of directly utilizing or storing this energy.

The invention also resolves the optional module for production of electricity based on the principle of the thermoelectric effects while using heat energy of at least one condenser and/or at least one evaporator of the cooling equipment. The heat energies that can be used for the production of electric energy according to this invention develops by way of an intrinsic system operation of closed circuit cooling equipment under the present influence of the surroundings, which in the case is an energetic environment.

BACKGROUND ART

The present-day methods of heat absorption for heat pumps are based on the circulation of the heat transferring media by the collector, which is created by one or more circuits made from either plastic or metal tubing with a circular profile. The primary resources for the heating of residential homes are mainly renewable natural resources earth—water—air. The heat that has been stored as a result of solar radiation. For those regions and country sides having seasons with temperatures below zero, soil and water are mostly considered appropriate natural sources. These sources offer relatively constant temperature energetic potential year round. The very changeable energetic potential contained in the supra-surface atmospheric layer in the surrounding air could be used for ventilation of houses. The changing temperatures during the day and throughout the seasons in these areas do not positively influence the compressor, which is exposed to unbalanced load during operations.

In the course of collecting heat from subsurface layers the collecting tubing is either placed into excavation pits or in the case of earth bores they are installed into the bores, which are then filled up. The collector media are based on a mixture of water and non-freezing additives, CFC-free refrigerants as well as mixtures according to the type of collecting system and construction of transfer cooling equipment. Circular tubing is used in plastic collectors. Metal piping is usually made of copper. Both plastic and metal tubing can have an internal and external surface finish such as grooving or wall waving; the finish can also contain several layers. These kinds of amendments are usually executed in order to enlarge the heat transfer surface of the tubing or to increase the efficiency of heat transfer as well as to increase the resistance against corrosion, abrasion and breakdown and for easier bend ability. For installation into source environment the tubing is also shaped; by way of its external surface finish the tubing is mechanically fixated or welded into various shapes of tubular registers. The tubing is delivered as circular coils to construction sites or the location of further production. The disadvantage with single-layer or multilayer tubing is the elaborateness when shaping and laying it, which usually requires manual passing the so-called tubing memory. This is evident especially when shaping plastic tubing or with metal tubing of a larger diameter. Coil tubing collectors also take up more space when transporting and storing.

Medium and heavy machinery is used for constructing the present-day collecting systems of geothermal heat pumps. This usually refers to wheeled excavators that weight tones or to mobile drilling or compression forming equipment. This machinery allows for effective work management that corresponds to the present condition of technology in the sector of geothermic heat collection. The heavy machines are often transported for larger distances. In terms of history several methods and options of constructing subsurface geothermic collectors have been developed. When excavating soil for tubular heat pump collectors with the heat pump heating output of 10 kW the amount of soil that must be removed is 50 to 100 $m^3$ in today's most cost-effective methods of construction. In the course of implementing drilling or compression forming for the same heat pump up to 130 meters of soil or rocky holes in length is needed.

Various methods and designs to produce ground heat exchangers were introduced. All are piping based in the collecting part of the heat pump systems. Direct exchange systems often replace the plastic ground loops with the smaller diameter copper loops. The ground evaporators and the indoor condensers consists of pipes with a certain degree of thermal conductivity in which the heat pump coolant circulates. Disadvantageous is small surface and small heat exchange area of the pipe surface. In the field air heat exchangers—all also use closed copper or metal pipes with metal profiles as evaporators. The heat absorbing parts have no moving parts or they are mostly equipped by a fan. It maintains high efficiency even at high outdoor air temperatures. The efficiency falls during outdoor temperatures go to the zero or below. The ice evaporators with or without the fans can be equipped by a loops placed in the Earth. However, all results are a medium efficiency heat pumps.

The document DE3039289 describes the system with ground metal cylinder tanks. The tanks include heat-carrying antifreeze fluid which is driven by the circulating pump—so-called antifreeze solution. It's obvious that the cylinder tanks with diameter D must have a high capacity and a large surface so that they could collect the ground heat required for the house heating. The tanks are buried under the ground surface in different depths without the possibility of their direct maintenance and/or check from the surface. The tanks are demanding for production, material consumption and installation. Indirect flooding irrigation of ground around the cylinder tanks by rain water is further mentioned in the document. According to the described solution the rain water falls on the roof of the object and is diverted down to the outside terrain. It's obvious, according such an indirect way of flooding irrigation, that the water absorption will be more complicated due to the frozen ground in spring period. The rain water absorption can't even occur, if the soil is tight and/or the tanks are put deep under the surface. The solution takes into account the depth from 2 m under the surface which is intensive for the construction and for the scope of ground works.

The dimensioning of the intrinsic output of the heat pump and therefore the scope of ground work can also influence controlled ventilation of heated houses in which energetic potential of changed air is reused. The demands on controlled ventilation of houses increase together with the increased demands on the quality of insulation of constructional materials of the construction site. The total demands on reused heat when ventilating the home is up to 60% of the total annual heat supply for heating. Changed air, or in this case waste air, usually has an average temperature of +20° C. The transfer of heat energy occurs in the following ways. The first possibility is to use a recuperator, or in other words a countercurrent channel air-to-air exchanger in which heat energy is removed from changed air and is transferred to air that has been aspirated from outside. The efficiency of the present-day recuperators is about 90%. The high efficiency of this equipment leads to the development of condensate that can freeze on the plates of the recuperator and therefore influences its functioning. This effect arises when the outside temperature of aspirated air falls below zero. For this reason recuperators began being equipped with a specially ground heat exchanger, which secures preheating of the aspirated outside air. These kinds of ground exchangers can simultaneously cool the house in the summer when the outside temperatures are high. The temperature of the air that was cooled in the ground heat exchanger in the course of the cooling function is +16 to +23° C. upon entrance into the house. The disadvantage of this method is the possibility of the condensate freezing on the recuperator plates in the winter if preheating of aspirated outside air in the ground heat exchanger had not been selected.

The next possibility is inside air that is cooled when passing through the air-to-refrigerant exchanger or the passage of air—non-freezing mixture inside the heat pump. Fresh outside air is aspirated into the house by way of a ventilation hole in the periphery walling or in the roof. The positioning of the exchanger normally depends on the cladding of the interior heat pump or by the house's utility room. The disadvantage is using a different specialized heat exchanger in the heat pump and a more complicated construction of the heat pump.

The coefficient of performance COP expresses the work efficiency of heat pumps or, in other words, their immediate operational savings. The factor can be increased in several ways. One example is the utilization of the heat energy of rain water collected from the roof of the house.

Another accessible heat source for heat pumps can be solar collectors, which transfer direct solar heat by way of circulating fluid. In terms of family-type homes solar systems are usually designed smaller and serve to heat up service water in the boiler found inside the home or in the attic. Larger solar systems also support warm-water heating in the winter as a heat source for the heating of an outdoor or indoor pool. In today's technology heat pumps, as heat generators and therefore engineering equipment, exist in the design that is positioned either inside or outside with respect to the tempered house. Outdoor versions of heat pumps have been construction all conceived as single-purpose equipment with conforming arrangement of individual components. The disadvantage is that these heat pumps does not integrate other natural sources including direct solar energy, geothermic heating or the cooling of aspirated fresh air or the utilization of rain water and underground water.

The solution with indoor heat pumps and with propeller and gear wind generator is introduced in the document WO2005/028861. The heat pump system is again piping based in the collecting part. The solution ensures production of electricity for the independent supply of the heat pump system. It's known that the disadvantage of the wind electricity generation is its dependence on the wind speed and on the long-term local wind conditions. If the wind speed isn't sufficient then the required electric output isn't achieved or the electricity generation is not possible at all. The power allowance is therefore necessary for case of wind calm in less favourable localities, which further increases the system price. As described in the document, the heat supply is ensured by the complicated solution of the traditional water based heat pump systems connected in a complex with independent fluid collecting tanks. The delivery of the heat energy which is collected from the ground, outlet waste water and from the block of solar collectors is provided by independent electric circulating pumps. Water and antifreeze additives or so-called antifreeze solution are used as the heat-carrying filling. In a typical heat pump installation, the ground loop consists of hundreds or thousands of feet of plastic piping buried in deep and wide trenches. This antifreeze solution must be pumped through hundreds of meters of piping, which consumes a significant amount of electric energy. The whole system with the heat pumps further includes many parts that are connected without mutual construction and energetic support. Such an installation takes a lot of space inside and outside the object. The scope of the ground works on the ground pipe collector is large and expensive. It's similar with the wind generator of the required power output. According to the document it's also possible to connect ventilation and conditioning unit with an extra recuperator and other heat pump with two electric circulating pumps. Such a solution will again increase the price and the effort on the whole installation of the propeller wind generator with heat pumps, ground pipe collector, fluid tanks and solar collectors.

A number of ways for the transfer of heat into electricity by thermoelectric cells were described. Thermo-electric conversion is also mentioned in document US2005/087221. This document describes the system for the conversion of the heat energy of the fire operated equipments. Produced electricity is used for the powering of a circulation fan of the heating equipment. The system reduces the consumption of the electric energy for the drive of a fan. Production of electricity from the heat energy gained by wood burning is also described. In case gas can't be used as a fuel, wood or oil is burned. Fuels that produce contaminants by burning are burnt. The thermopile with the heat conversion from high temperature heat sources is also mentioned in this document. Hot springs, solar heat and volcanic pools are mentioned. The heat from high temperature source is applied through the heat pipe to the thermopile. The heat energy follows this way: flame/high temperature source—heat pipe—thermopile/ electricity—application. It's obvious that electricity is produced in energy converter out of the reach of compressor refrigerant circuit and out of the reach of a heat pump working circuit. There is no communication between refrigerant and/ or heat carriers of a compressor heat pumping systems and the thermopile when electricity is produced. It's evident that the possibility of the realisation of the heating and cooling equipments in this way and method, and with such high temperature sources is limited just by their occurrence. Gas, oil and wood are paid fuels which are usually demanding for storage and transportation to the place of consumption. Hot springs, year-long solar heat and volcanic pools don't usually occur on family houses plots and in inhabited areas. The application ensures transformation of wasted heat from fire operated heating device to electricity to power the fan.

On the contrary, in the inhabited areas where the above mentioned burning fuels or mentioned high temperature sources cannot be found, systems with heat pumps that use so-called low potential natural heat are being built. It means the solar energy contained in ground, water and air is mostly used. In such households also other devices with a heat pump circuits and/or refrigerant compressor circuits are used as common home appliances e.g., refrigerators, freezers, air-conditioning units etc. These home appliances use the low potential heat energy contained in solids, liquids and gases. The different solutions introduced in my application WO2008/014726 deal just with such home appliances. They therefore have wide range of uses. The electricity is produced by direct thermo-electric conversion from heat energy of a refrigerant circuit and/or circuits, working circuit and/or circuits of a heat pumping and/or heat pumps, and of all other devices with cooling and heating circuits. The heat energy transmitted from the heat source to the another place by a refrigerant circuits is used for electricity production. The heat energy follows this way: heat source—heat transfer medium and/or refrigerant of a refrigerant circuit—compression and condensation for heat delivery and/or expansion for heat extraction—thermoelectric conversion/electricity—application. It is obvious that a mutual heat communication is produced between the refrigerant and/or heat carriers of a heat pumping circuit and the thermoelectric layers for the electricity production. The electricity produced by thermo-electric conversion serves backwards for the system refrigerant compressor drive if realized and/or for the supply of light and/or other device parts and/or for other electric applications.

The use cases according to this invention and above introduced and described heat energy way are, the heat pumps for the household heating and/or cooling, the use of the electricity consumption lowering for the supply of compressors, circulation pumps, ventilators; also in the case of refrigerators, freezers, refrigerated show cabinets, the electricity supply of light, light of an advertisement, brandnames, trademarks, the electricity supply of air-conditioners and their electric parts, compressors etc. Heating and/or cooling devices according to this invention helping to reduce dependency on fossil fuels. At the same time, it contributes to lowering of the pollutants from burnable fuels.

The belt/plate heat exchangers according to this application are suitable for heat collection and/or heat delivery on the primary side and/or on the secondary side of a heat pump; in other words outside and/or inside the house. The use case generally by refrigerant heat pumping devices is outside and/or inside the space to be heated/cooled. Inside the belt/plate heat exchangers can lead in various directions at least one channel or chamber and used heat carriers. The channels or chambers can also have various and variable shapes and profiles. The heat pump with a collection system and/or transfer of heat energy according to this invention can be equipped with the optional modules for improving heat exchange efficiencies and a value of coefficients of performance.

DISCLOSURE OF THE INVENTION

The system for collecting and delivering heat energy with modular heating and cooling apparatus solves the disadvantages described in the existing status of the technology. In the sector of geothermic heat collection for heat pumps, on the primary side, the collecting system is resolved by way of chamber or in other words channel plate and belt collectors or in other words collecting bodies with the flow of heat transferring media. At least one plate or at least one belt within the system is placed in the source thermic environment.

It is natural for these chamber or channel belts or plates to be connected to the secondary side as well; in other words heating or even condensation sides inside the house where they can be transfer bodies positioned on the surface of the walls, ceiling or on the floors as the final layer or positioned within the construction under the surface.

In this instance the collecting plate is understood to be the integral collecting body exhibiting adequate stiffness, not overly bendable and not easily folded back into a roll. The plate can be transported and stored in its entirety. The stiff plate can also be divided up into several same-sized sectors or ones with varying lengths where the sectors are coupled together in a series by tubing. By bending the tube the plate sectors can be piled on top of each other for transportation or storage.

The collecting belt is understood to be the integral collecting body that is adequately flexible and can be bent and folded back into rolls for transportation or storage. At least one influx and return tubing, which aids in the influx and outflow of used heat transferring media, is connected laterally to the plate or belt. The plates and belts are also characterized by the fact they contain chambers or channels closed under the exterior surface and that the channels are not made up of circular or shaped tubing, whose length is uninterrupted and integral; furthermore the tubing contains one or more layers and is made of metal, plastic, glass, ceramics or another material.

According to this invention the heat transferring media utilized in the modular heating and cooling apparatus can be on the basis of CFC-free refrigerants or its mixture, a mixture of water and non-freezing additives, separate technical gases or its mixtures. This media is used for the direct or indirect transfer of produced heat to the selected heating bodies.

By way of distributing manifolds and collecting manifolds, collecting plates or belts are connected within the outside heat pump or only within the outside skeleton. The generator or in other words the heat pump, which is the main transfer part of the apparatus, contains at least one compressor and according to this invention, it can be located inside or outside the heated house or in both of these parts. According to this invention if the generator is outside the house, at least one compressor and the other necessary components are advantageously located on the supporting plate of the skeleton under its cover or lid. This location also offers good accessibility for basic checks and servicing.

The outside supporting plate and its components are removable from the skeleton in case of the need of servicing, which takes place in special work shops. According to this invention the supporting plate is straight and/or has an internal central embodiment and together with the top edge of the bottom part of the skeleton, the components waterproofly divide the bottom part of the space between this plate and the lid and simultaneously divide the bottom space from this plate, sealing and the bottom part of the skeleton. The supporting plate's main constructional assembly plane in terms of the skeleton is above the surrounding terrain even though the bottom part of at least one compressor can penetrate the top surface of the surrounding terrain. Eventual technical transmission of the supporting plate into the bottom embodied part is clammed waterproof. By way of waterproof the skeleton is further interconnected by at least one influx and one return tubing to the distribution system inside the house and/or with the inside heat pump and/or hot water boiler. If a casing of the inside equipment is being implemented simultaneously, there can be either at least one compressor or only a hot water boiler or both. According to this invention air-conditioning control mechanism for the controlled ventilation of the house can also be located on the top part of the internal casing of the apparatus.

The entire apparatus is resolved out as modular and above-standard. The design of modular heating and cooling apparatus according to this invention allows for the exterior diversification of individual functions, of modules for the utilization of geothermic heating or cooling of air for controlled ventilation as well as for the utilization of water's energy and for the direct utilization of solar radiation.

Individual above-standard modules are advantageously interconnected in one common outside skeleton and can be lodged together in the course of construction of the system's collecting parts or in other words in one operational cycle.

It is possible to connect the apparatus to a direct condensation heating system on the inside side of the house. It is also possible to connect onto the warm-water heating system and onto the air heating system by way of respective heat exchangers. The condensation heating system can also utilize chamber plates and/or belts that are constructionally the same or similar to plates or belts of the outside collectors. In the case of direct condensation, pressurized gas media will recirculate in the heated parts inside the house.

The design of the entire apparatus, the constructional arrangement of the individual parts and modules is evident from the following description, from the design drawing parts and from the implementation examples. The heating and cooling equipment with a collection system and transfer of heat energy according to this invention contains the following modules:

basic heating module of the outside and/or inside equipment including a plate and/or belt system of heat collection with a selected heating system, where predominantly directly fluid condenses in condensation belts and/or plates and/or it is warm-water system with a heat exchanger and/or it is an air system with air heat exchangers and fans;

an optional module of controlled ventilation with a soil-air tube or plate heat exchanger—a large portion of produced heat is returned back to where it was removed from—no special recuperative unit for the utilization;

an optional module of an irrigation of rain water and/or other kinds of water an optional module of an outside accumulation tank containing at least one heat exchanger;

an optional module for the exchange of heat between either condensation or cold refrigerant aspirated by compressor of the types tank within a tank, tube within a tube system or tubing within a tank;

an optional module for the production of photoelectric electricity by way of photovoltaics;

an optional module for the thermoelectric production of electricity for the supply of at least one compressor and/or other electric motors or parts and/or for other electric application with the possibility of connecting onto the local distribution network; it is then possible to supplement with a photovoltaic system and/or with a type of an alternate generator, water generator, air generator, etc.;

an optional solar module with a plate collecting construction of actively cooled solar collectors and with the possibility of diversification of thermoelectric belts for the production of electricity;

an optional module for the pre-heating of warm water in order to supply the house and/or pool water in the outside accumulation tank by solar heat and/or by compressor;

The collecting system is resolved here by using collecting plates and/or collecting belts, which can be laid out radially, paralelly, trapezoidally as well as contour linearly. Both radial and mutually parallel layout of individual plates or belts can be laid-out linearly as well when several plates or belts are positioned one after the other. If individual plates or belts are positioned one after the other, they can but do not have to be coupled together in series by connecting tubing. Radial or mutually parallel layout assumes parallel interconnection of individual plates and/or belts and/or their linear series, which has a lateral influx and return tubing connected. The tubing is interconnected with the distributing manifold and collecting manifold of the entire collector preferentially located in the outside skeleton or inside this skeleton or directly interconnected onto the compressor inlet and onto the return tubing from the condenser. The layout of the plate and belt collectors can be combined as well or in other words from the radial, parallel and trapezoidal parts and partially linearly as well according to the appropriateness of the specific situation on the lot.

Radial layout assumes placing the individual branches of the collectors in those positions where mutual regular and/or irregular angles are selected between the imaginary axes of collecting plates and/or belts; these imaginary axes can but do not have to converge into a tone mutual central point. Parallel layout assumes the imaginary axes of plates or belts are mutually parallel. The layout can also allow for the collecting plates and/or belts to be mutually trapezoidal. The layout is illustrated in the drawings. The plate or belt collecting system consists of at least one plate or at least one belt, which is positioned preferentially vertically upright in its terrain; other possible positions include oblique angle-wise or parallel, which means the surface of the main collecting plate or belt with respect to the surface of the lot or surface level. Collecting plates and/or collecting belts can also be placed into a water source and/or into bore.

Soil is the preferential source for thermic surroundings of described collectors. The surroundings can comprise of water or other liquids, solids or gas. A supplementary contact surrounding for collectors can also be solid matter or liquids exhibiting a better heat conductivity than the surrounding source including soil. Solid matter or liquid exhibiting a better heat conductivity than the surrounding source can be bordered by plastic or metal or other case, whereas they remain in direct contact with the surface of the collecting plates and/or belts. When placing these collectors this solid matter can be in direct contact with the surrounding but does not have to bordered by casing.

Collecting plates and belts are made of one or more materials. If the plate or belt is made of more than one material or of several individual layers of only one material, these materials and/or individual layers can be mutually connected by gluing, various methods of welding, pressing and/or mechanically. The basic materials are metal and/or metal alloy and/or plastic and/or plastic mixtures. Other materials can be include glass, ceramics and laminates. Solid plates or bendable belts produced of one and/or more materials consisting of one or more layers comprise the integral collecting body, which has influx and return tubing of a small diameter in respect to the size of the main collecting body. Such plates or belts are characterized by integral collecting surfaces preferentially in the rectangular shape. The collecting surface can also have the shape of a square, triangle, and quadrangle or be multi-angular. The boundary of the collecting body can therefore also be skewed, many-sided, rounded or circular along its perimeter. In terms there are preferentially narrow and long quadratic shaped collecting bodies or in other words plates or belts. At least one transport tubing laterally empties into the collecting body.

Inside the plates and/or belts there is a system of chambers or channels through which the heat transfer media flows. The heat transfer media that flows within individual chambers or channels can be in mutual communication by way of these chambers or channels. The chambers and channels can be independent and can also be mutually interconnected and intersecting at various sectors of the plates or belts. With respect to their mutual position they can converge and diverge in various ways and can mutually condense or thin out. The one case is when the plate or belt contains only one chamber or channel, which is longitudinal and can be directed straight or in various directions and curved. The layout of the channels or more specifically the chambers inside the plates or belts can be in a symmetrical and/or asymmetrical arrangement with respect to the collecting surface. With respect to the main surface collecting or transfer area of such a body, at least one channel or chamber can lead in various directions and therefore not only parallel with this surface. They can also have variable directions, shapes and profiles. The profile can be circular, square, rectangular, triangular, multi-angular, rounded and compound. In the cross-section of the plate or belt, or in other words in the cross-section perpendicular to the main collecting and transfer surfaces of this body, there can be many openings for these chambers or channels positioned uniformly or not uniformly next to one another within this cross-section. It is also possible for more than one heat transfer media to flow in the chamber desks or belts by way of independent channels.

So-called flooded plates and/or belts describe the situation in which the entire plate or only part of it has chambers or channels and the other part is chamber-less, which is also possible. These kinds of collecting bodies are flooded by heat transfer media that could again include coolant or refrigerant or its mixture, water, mixtures of water and non-freezing additives, individual technical gases or its mixtures. The chamber-less plate or belt can be made up of one or two or more sectors. If there are chamber-less sectors within the body, the sectors are partially separated by vertical barriers that are connected to the bottom side of the collecting body; their function is to prevent the accumulation of heat transfer media especially that of liquid refrigerant mixtures in the most bottom space of the so-called flooded evaporator or collecting body. One example is one corner with gravity inclination. At least one transport tubing again empties into the collecting body laterally.

The influx and return transport tubing can be made of metal or of plastic and/or of the combination of the two. The influx and return tubing is interconnected onto the distributing manifold and collecting manifold of the apparatus with the parallel interconnection of plates and/or belts. Connection of the influx and return tubing of one plate and/or belt onto the compressor is possible with one plate or one belt and/or with the mutual series interconnection.

The lateral emptying tubing in this case plays a transporting role; the heat transfer medium circulating through the tubing circulates between the main collecting plate and/or belt and generator. This tubing plays only a small role in the actual collection or heat radiation and for this reason it can be partially or completely heat insulated. In this way the system of collection and heat transfer by way of the manner in which the plates and/or belts are resolved in this case differ from the manner of collection and transfer displayed by traditional collecting tubing, which is made up of one or more tubing loops. This kind of plastic or metal tubing are usually laid out into various tubing registers. The heat transfer process within collecting plates and/or belts is not implemented by way of the surface of integral sectors of circular tubing but by way of the surface of plates and/or belts. The surface of plates and/or belts does not have to be straight and smooth but can be wavy, furrowed or roughened on one side or both sides. Collecting plates or belts with this design of influx and return tubing can also act as heat transfer plates and/or belts. During this function they are located inside the house for the purpose of heating. They can also transfer heat to outside in the course of a reverse working cycle of the equipment.

Collecting plates or collecting belts with influx and return tubing in the above design can also function as plates and/or belts that transfer heat from solar collectors. In this function they are preferentially located outside the house in a low-potential environment such as in the soil. This kind of plate or belt can but does not have to be contact-connected to the collecting plate or belt. The flow of solar media can be countercurrent in terms of the flow of the media within the collecting plate or belt. Contact-connection on the other side of the collector can be found in constructions where a thermoelectric belt for electricity production has been located between the collecting plate and the transferring solar plate.

If the plates or belts are in the condensing regime, a mixture of hot gases discharged from the compressor flow inside. In the course of gas passage through the condensation plates or belts there is a transfer of heat to a cooler environment.

If the plates and/or belts are placed into the soil surface, the trenches for this placement are prepared by a trencher. In the case of heat pumps these machines have been used for the preparation of trenches for the placement of tubing. Using a trencher or a mini excavator in this case is appropriate because vertical plates and/or belts require a narrow soil trench and the volume of extracted soil is therefore minimal.

The manner of installing collecting bodies is described. At least one plate and/or belt is inserted into the prepared trench and the area surrounding it consists of the excavated soil, sand and/or of matter of better heat conductivity than of the surrounding soil. When this is the case, the fluid is executed from the bottom to the top edge of the plate and/or belt and the excavated soil is then used to fill the trench up to the surface of the terrain. It is evident that the position of the plate and/or belt does not have to be precisely vertical with the surface of the lot despite the position being preferential; it can also be transverse or horizontal. With vertical positioning the plates or belts in the trenches do not have to be straight but can be wavy, bent, kinked and inclined. In the same way the pre-made soil trenches do not have to be longitudinally straight and can be bent, wavy or kinked according to the way the machine runs in the terrain. The process of constructing the collector as a whole can be implemented progressively—the previous trench is filled up during the excavation or after excavation of the new trench. In this way it is not necessary to execute full-area or partial capping and manipulate with such a heavy volume of soil. The lot during construction does not therefore give off a devastating impression.

The entire system of heat collection with modular heating and cooling apparatus according to this invention is viewed as above-standard with individual modules. One such module is the geothermic heating or cooling of aspirated outside air for the purposes of controlled ventilation of the house. Tubing of the air exchanger is placed into the soil together with plates and/or belts in this module. This exchanger serves to pre-heat the aspirated outdoor air for the purposes of controlled ventilation house in the winter and for cooling effects in the summer. The air exchanger is located at the bottom along small-volume trenches and is vertically bent upwards at the end of the trench. It is then positioned transversely above the top edge along the collecting plates and/or belts in such a way as to create a progressive inclination from the top opening for air suction above the terrain to the bottom inlet. With this kind of progressive inclination there is spontaneous gravitational drainage of condensate into the space surrounding the bottom of the skeleton. According to this invention integral or divided distributing manifold and collecting manifold of flexible tubing of the ground exchanger are used. If the system is expanded to include this module, the distributing manifold and collecting manifold of the ground exchanger are interconnected by way of influx and return tubing to air mechanism and air distribution system inside the house by way of influx and return tubing. The space below the lowest embodiment of the tubing of the exchanger surrounding the bottom of the outdoor skeleton serves as drainage and/or condensate infiltration from the shoulder of the air tubing. For this reason the skeleton can be positioned on a bed of sand and gravel, which simplifies the infiltration of condensate or cleaning fluids. The distributing manifold and collecting manifold of the air tubing surrounding the bottom of the skeleton can also be view as a collector with gravity drainage of condensate into the sewage. In this case a backflow valve can be imbedded into the tubing before connecting onto the sewage. There is also possible to use a pump with only small electricity consumption. Than is the condensate pumped away from the space for condensate.

The above-ground part with an inlet of at least one air tubing exchanger has been constructionally resolved as a supplement to the skeleton and is found just under the flange of the supporting plate and skeleton cover. This suction and expiratory aboveground part is conceived similarly to the bottom part either as a whole and/or as a divided part. There are also exchangeable dust and smell filters here. The cleaning of such a gravity inclined exchanger by flushing from the opening to after the removal of above-ground filters is easier than when the exchanger tubing is being laid horizontally.

The part with an inlet and outlet of at least one air tubing exchanger can be constructionally resolved as one tube supplement to the skeleton. The diameter of the tube supplement is here bigger than the diameter of the skeleton bottom part. The volume between the outside supplement and inner bottom part of the skeleton can be divided into two or more parts with an inlet and outlet of at least one air tubing exchanger.

The module with controlled ventilation does not assume for the mounting of recuperator inside the house even though its connection is possible within the system. The entire collecting system is placed into several radial or otherwise positioned trenches. One reason why this number has been proposed is due to the requested pre-heating output of air exchangers in the winter. According to this invention the ground exchanger system can be functionally divided into two parts or in half for example. During actual activity, this solution brings on regular switching of the flow of aspirated and discharged air between both geothermic parts of the exchanger. Regular switching on occurs by way of the air mechanism located inside the house. The cool aspirated air removes heat from the soil in one part and the expired inside air releases heat energy in the second part. By regularly switching both parts the heat energetic potential of the inside air is released to the geothermic surroundings of collectors. This potential is again utilized for the pre-heating of cool aspirated outside air and/or it is collected by the plate and/or belt collecting equipment. In the main heating seasons this is in either intermittent or in constant operation. In the winter there is no temperature dissipation of heat from wastage air in the soil because the direction of heat flow is always from a warm environment to a cooler one. In this case the heat flow is directed towards the collecting surfaces of the plates and/or belts.

In the summer months there needn't be cyclic switching of air mechanism as is the case in the winter. The wastage air has a high temperature and would influence the geothermic surroundings of the collectors for the cooling mode. It is possible to switch the control mechanism to the mode of direct aspiration of outside air by way of both parts of the ground exchanger. By way of regulation valves the wastage inside air is diverted outside by way of a ventilation hole in the construction of the house. In this mode the geothermic air exchanger is utilized entirely for controlled ventilation, which in this case is for house cooling. The inside air distribution system and both air connecting tubing leading from the outdoor bottom distributing manifold and collecting manifold of the air tubing are diverted to the air regulatory mechanism. Exchangeable dust and smell filters for both influx tubings are on the tubing in front of and/or behind the mechanism or under the closable cover. The summer cooling mode of the module for controlled ventilation is advantageously operated when the outside temperature is above +26° C.

The advantage of the module for geothermic controlled ventilation-cooling of the house according to the invention is that it is not absolutely necessary to use a special recuperative unit for the utilization of waste heat. In this case there is a transfer of heat from changed inside air back to the immediate environment of collecting plates and/or belts. In this way a large portion of transferred heat is returned back to where it was removed from. This heat is collected again by heat transfer medium of plate and/or belt collectors and can also be collected by cold aspirated air after the cyclic switching on of the air mechanism. The efficiency of reutilizing heat from the air is high in such a system. The advantage of vertically positioning air exchangers on top of another with gravity inclination according to this invention is the possibility of free drainage of condensate and its natural infiltration into the bed and soil or its drainage into the sewage. The eventuality of the condensate freezing inside the ground exchanger does not bring on any operational limitations to the ventilation system and this effect is partially eliminated by regularly switching the air regulation mechanism when warm air from the inside of the house with an entrance temperature of +20° C. flows through the tubing. Another advantage is the laying of the air exchanger in one cycle with the collecting plate and/or belt. A certain reduction in the diameter of the air exchanger tubing used is possible with parallel division into many circuits. The scope of ground work is decreased and it is easier to work with smaller tubing. In this way the air will remain in the collector tubing for the necessary period of time. At the implementation of electric generator module for electricity production this module's electric fans, which secure the circulation of air will be preferentially supplied with the electricity that was produced. The inside control mechanism of controlled ventilation even allows for complete disconnection of the ground exchanger and accepts aspiration of the outside air by way of a ventilation hole in the construction's periphery.

It is natural for the air exchanger to also be located in the soil between radial and/or parallel and/or trapezoidal arrangement of plates and belts therefore in their own trenches without collecting plates and belts.

The exchanger is comprised of one-layer or multilayer circular tubing whose internal and external surface is smooth, wavy or grooved. Plastic is preferentially the material for this kind of air exchanger. Other possibilities in terms of materials include metal, cast iron, stone, concrete or eternit.

According to this invention the heat transfer body of the air exchanger can be composed of chamber plate with connection into influx and return tubing. In the case of this design the size of the chamber will be adjusted by the requested pressure losses with respect to fans that secure air circulation.

Another module according to this invention is an irrigation module for the direct utilization of rain water and/or other kinds of water for the energetic support system of plate and belt collection. Thanks to the effect of gravity in this application the heat energy of rain water is distributed by way of a distributing manifold into individual sectors of perforated plastic tubing, which has been inserted into drainage-like tubes that have a larger diameter than the first perforated tubes. Rain water in excess of the volume of the vertical tank otherwise solar exchanger on the facade is diverted by spilling into utility tank or pit. These pits are interconnected by tubing with the distributing manifold of drainage system and also serve to irrigate geothermic collectors following the cessation of rain following the emptying of vertical tanks on the facade. The utility tank or pit can contain a pump, which will optimally be supplied by electricity generator according to this invention under the condition it has been installed. Water from the tank can also serve other purposes. Following the earth-backing of soil plates and/or belts to above their top edges irrigation tubing sectors of the same length are laid with an inclination from the distributing manifold of water at the outdoor skeleton to the ends of collecting desks and/or belts. Released rain water is gravitationally infiltrated into the soil from the top edge of the collectors in the downwards direction. In the course of apparatus operation the collectors collect heat energy of this water. In this way the system's COP is increased especially in the spring when the outside temperatures, which do not decrease below zero anymore, lead to a quicker regeneration of the entire collecting system.

According to this invention the drainage distribution system is preferentially radial and the lay-out of this distribution, with respect to the surface of the terrain, copies the selected lay-out of soil trenches for individual collecting bodies. The drainage irrigation system is progressively laid in one working cycle immediately after lodging and the earth backing of individual collecting plates and/or belts. The design is evident from this invention's drawings. The advantage is the shortening and equal parallel division of individual irrigation sectors and the fact that lower pressure losses are achieved for water drainage within the length of individual shoulder.

Another above-standard module according to this invention is the outdoor accumulation tank, which is located in the outdoor skeleton. This multifunctional tank can be created from this skeleton. It can also be placed into the skeleton. According to this invention this outdoor tank can equipped with at least one heat exchanger and pressure expansion bag located inside this tank. It can also be equipped with at least one tubular heat exchanger, which wraps around the external surface of this tank, and/or a heat exchanger cladding, which also wraps around the external surface of this tank. In terms of exchangers the exchanger could also be of the type tube within a tube type or cladding within a cladding. This outdoor tank can only have one volumic part or it can be further divided by horizontal and/or vertical partitions into more volumic parts. The volumic fluid of this type of outdoor tank and heat exchanger could be liquid, gas or the combination of both. The actual volumic fluid of outdoor tanks can be in direct liquid or gas communication with the module for solar collectors under the condition they have been installed. They can also be in direct liquid or gas communication with heating system or with a part of it inside the house. They can also be in direct liquid communication with the tank or with the boiler that is located inside the object. They can also be in direct communication with the circuit of at least one compressor system of a heat pump. They can be in liquid communication with water, with waste water, with pool water or with heating system media. Communication in this sense means the mutual functional interconnection by way of the same medium. According to this invention the heat transfer media that can be used in modular energetic apparatus include refrigerant, a mixture of refrigerant, water, water and additives, gas or a mixture of gases. There is also the possibility of the casing or tubing bore being connected to the volumic part of this type of tank. The constructional material of this type of accumulation tank is metal or metal alloy, plastic or a mixture of plastics or fiberglass and/or the mutual combination of these materials. The material of tubular and cladding exchanger is preferentially metal or metal alloy whereas the surface is smooth and/or grooved and/or wavy-corrugated. The exchanger material can also be plastic or a mixture of plastics. The surface of this tank can be insulated against heat loss by using heat insulation and/or an air and/or gas gap. If there is a thermoelectric module for the production of electricity installed in the system, a thermoelectric belt can be contact-located on the surface of this tank.

Another module includes the mutual exchange of warm refrigerant to cold refrigerant gas aspirated by compressor. It is possible to place the refrigerant collecting tank into the volumic part of the outdoor accumulation tank. The refrigerant medium in the phase of liquid, gas or its mixtures is collected in the refrigerant collecting tank. The collecting tank of warm refrigerant has the integrated function of transferring heat to cooler refrigerant that is aspirated by at least one compressor while there is partial temperature tempering to the volumic part of the outdoor tank by the surface of the collecting refrigerant tank. In this case there is an internal exchange of heat by way of tank within a tank. This function can also be implemented by an exchanger of a tube within a tube or tubing within a tank type.

Another module is the production of electricity based on the photovoltaic effects by way of photovoltaic cells and/or photovoltaic foils located on the lid surface of the outdoor skeleton. Individual cells or a module of these cells or compact foils are attached to the lid surface of the outdoor skeleton. The electricity produced in this way can serve to supply the circulating pump, which transports the collecting system module's medium or it can supplement the thermoelectric module. In this case it is yet another way of functionally utilizing the above-ground parts of the outdoor skeleton construction. The module can be supplemented and diversified by photovoltaic panels located on the roof, on the facade of the house or are fixed on the earth surface. Photovoltaic collectors can be actively cooled by system's heat carriers.

Another module is the thermoelectric production of electricity, which is based on the principle of utilizing system temperatures that have developed in the course of operation of the cooling equipment. Plate and/or belt exchangers have large heat transfer surfaces. These collecting and transferring surfaces are flat and can be used for alternative production of electric energy. Condensation surfaces and/or evaporative surfaces can certainly be used for electricity production. The same applies to parts or the entire surface of solar collectors, heat transfer surfaces of accumulation tanks and boilers. The warming or cooling of surfaces of plate and/or belt heat exchangers is considerably balanced and for these purpose it is more applicable than the use of traditional collector tubing. The modular diversification for thermoelectricity production can be implemented by placing thermoelectric cells into thermoelectric belts on operational heat transfer surfaces.

It is evident that this type of electricity production is also applicable on adjusted heat transfer surfaces of large, medium-sized and small cooling equipment used in industry, in cars, in supermarkets and in households. Condenser heat is used to develop the higher temperatures needed for the necessary temperature gradient, which in this case is given due to the main operation of the equipment—cooling function. Up until now thermoelectric cells were used mainly for measuring temperature and for cooling following the introduction of semi-conducting materials. Well-known refrigerators function thanks to thermo cells; thermoelectric cooling of power processors in computer technology has also spread. The technique is based on the Peltier effects application, which is the reciprocal of the Seebeck effect. Another use of the Peltier effect is in the production of thermoelectric cooling equipment for automobiles, ships, airplanes as well as for wide use in laboratories. The Seebeck effect is crucial in the case of thermoelectric generators. It is presently used mainly as a source of electricity for space missions or for various inaccessible spots. The effect is also utilized in well-known cathodic protection of metal tubing.

The following description describes the new possibilities of electricity production by way of thermoelectric cells and foils with refrigerant compressor circuits and cooling equipment systems. A major advantage of the thermoelectric method of electricity production for the future is the fact that efficiency of the set-up thermoelectric generator is not dependent upon its dimensions, which is contrary to other methods of production claiming that efficiency quickly decreases with a decrease in dimensions and vice versa. In the case of thermoelectric production of electrical energy, efficiency conforms to the efficiency of the cycle and the quality of thermo cells material and all junctions.

The electric energy is produced from heat energy that arises from thermoelectric elements in the thermoelectric belts. The belts or foils are placed on heat condensers and on heat collectors. The thermoelectric belts can be also placed on the surface of outside or inside accumulation tanks and on collecting surfaces of solar collectors. The solar collectors are actively cooled by heat pump system's heat carriers. At least one thermoelectric belt or foil is contact-connected to a condensation and/or collecting plate and/or belt. Individual thermoelectric belts or foils are connected for a polarity change by way of insulated metal or optical conductions that are connected to equipment. This equipment serves to maintain effective operation of thermoelectric belts/foils-circuits in the case that temperatures change of $T1i<T2i$ would occur.

In the collecting process heat energy $Q1$ is contained in low-potential source environment. In the course of operation of a heat pump or cooling equipment this energy is collected by a selected heat transfer medium that circulates in the heat collector. In this case source environment is viewed mainly as soil, water, air, waste heat and solar radiation. Waste heat arising from productions or from energetic operations reaches temperatures of tens to hundreds of degrees Celsius. The solar-radiated surface can also reach up to +200° C. in the summer. Refrigerant and a mixture of refrigerants, water or water and additives, gas and/or a mixture of gases are the main circulating heat transfer media. Heat energy $Q1$ with a higher energetic potential and higher temperature $T1$ can be systematically increased further by inducing heat from solar collectors.

Thermoelectric belts/foils have two surfaces with differing temperatures during the heat production process. One surface is in heat communication with the selected collecting medium and the second surface is in heat communication with the source from which the heat energy is collected. Due to the fact that the collecting medium circulating within the collector normally has a lower temperature $T2$ than the surrounding source environment there is the development of a temperature difference that is transferred to the surfaces of thermoelectric belts or foils. The collecting fluid is the carrier of energy $Q2$ of a lower potential. This is from energy evaporators in cooling equipment circuits. The so-called cooling output of equipment is used as a technical indicator with cooling equipment. The surrounding environment is the supplier of a higher temperature $T1$ from energetic potential $Q1$.

One thermoelectric belt or foil surface can be indicated as cool during the process of electricity production. This cool surface is influenced by low temperature $T2$ of the circulating medium in the collecting part. With optimal construction of collectors and thermoelectric belts the surface of thermoelectric belts can be in direct contact with the circulating medium. There can be more thermoelectric belts on the exchangers and do not have to have the same dimensions.

In the case of tubing collectors with cooling equipment it is generally possible to achieve a flat surface and adequate surface by way of a passage through a number of sectors of such tubing by way of a mutual heat transfer plate and a high-quality contact connection. One side of the plate would be the working side of the thermoelectric belt or foil. It is also possible to directly place the thermoelectric foils onto the surface of tubing.

The other side of at least one thermoelectric belt or foil can be called warm. This surface is influenced by the higher source temperature from which heat is collected. According to this invention water, soil, atmospheric air, air from the house or other gases can serve as carriers of this energy. For direct utilization of air heat energy the air will be aspirated and compressed by fans on adjusted surfaces of air evaporators and condensers of cooling equipment, heat pumps or air-conditioning units. Thermoelectric belts, foils, cells must be placed on heat transfer surfaces, which are appropriately finished for this method. By inducting air a higher system temperature $T1$ with the evaporator and a lower system temperature $T2$ with the condenser is developed, which is necessary for the functioning.

It is possible to increase thermoelectric temperature differences by way of countercurrent or concurrent induction of heat from solar collectors to the warmer side of the thermoelectric belt. When the sun is shining even in the winter this temperature can be several tens of degrees Celsius with solar liquid collectors. The heat is run along the surface of the collecting plate or belt again by the chamber or channel system. The thermoelectric belt or foil is placed in contact between the collecting belt and solar belt. Solar heat can be stored in accumulation tank for a shorter time. The induction of heat from actively cooled solar collectors to belt and/or plate collectors is also increased COP of the heat pump.

The thermoelectric belt can also be placed on the surface of the accumulation tank. Coolness is developed by the cladding or tubular exchanger medium. Heat insulation is placed outside this cladding or tubular exchanger. The temperature inside the tank is the higher temperature $T1$ of the tank's solar fluid. In this way the necessary thermoelectric temperature difference is developed once again. Coolness can be developed by the influence of this surrounding environment of the outside embodied accumulation tank. With controlled ventilation by way of a ground heat exchanger it is possible to induce changed inside air into the surroundings of the collecting thermoelectric belts or foils and in this way heat energy $Q1$ of these source surroundings is supported. The incoming temperature of the air from the house is usually +20° C.

On the condensation side of the cooling equipment, it is beneficial that the condensers again are of a plate or belt type with a system of internal channels or chambers for the circulation of hot gas displaced by a compressor. During heating the thermoelectric belt or foil is placed on the surface of the condensation plates or belts. With optimal construction its surface is in direct contact with hot refrigerant gas from the compressor outlet. This is the heat source side with a higher temperature of T1 from the heating condensation output of Q1. The heating output of the entire apparatus is listed as the technical indicator in heating systems. Temperature T1 of a condensation plates or belts is for example about 90° C. when in operation. A special sealing or plaster stiffened by facade reinforced mesh can be pulled onto the surface of condensation plate or belt. The other side of the thermoelectric belt is in contact with the construction of the house or with the inserted thin plate made of insulating material. This cooler side has a temperature of T2. The construction of the inside is from the back side of the embodied insulation plate. In this way a temperature difference in the scope of tens of degrees Celsius has again been developed for the activity of thermoelectric belts or foils on the condensation-heating side of the system. With cooling equipment the colder temperature T2 is generally achieved by inducing cooler water or water with additives, gas or mixtures of gas, or air.

The actual activity of the thermoelectric cell is well-known due to the thermoelectric effects description. We consider thermoelectric effects to be those effects during which heat energy is transformed to electricity and vice versa.

If the temperatures of both contacts within the circuit are different, the Seebeck effect is applied. Simply if two conductors made of various metals are connected within a closed circuit and if the connections are of different temperatures T1 and T2, electricity therefore flows through the circuit. Seebeck's voltage $U_S$ that is generated by the temperature difference T1−T2 is $$U_S = s \cdot (T1-T2),$$

where s is Seebeck's coefficient ($V \cdot K^{-1}$), which indicates the degree of thermoelectric voltage arising from a temperature difference of one degree and is expressed by $$s = k/e \cdot \ln(n_A/n_B),$$

where k is Boltzman's constant ($J \cdot K^{-1}$) share of the gas constant R and Avogadr's constant N; e is the elementary charge and $n_{A,B}$ is the concentration of electrons in metal A and B. Seebeck's coefficient is further described by the extension of Mott's equation.

Seebeck's effect depends on the fact that there is a change in concentration of electronic gas with a temperature change within the metal or semiconductors. The thermoelectric voltage is low for most metal pairs and thermoelectric voltage achieves its highest values in semiconductors. As a result contact voltage in the metals and semiconductors is approximately of the same value. Besides contact voltage volumic thermoelectric voltage appears in metals and semiconductors as well and is much higher in semiconductors than in metal. Both the kinetic energy of free current carriers and their concentrations increase with temperature. With N type semiconductors electrons diffuse from warmer to cooler spots and the cooler ends of semiconductors are charged negatively. With P type semiconductors electrons diffuse from warmer to colder hole spots and the colder ends of semiconductors are charged positively. A semi conducting thermoelectric cell comprises of two semi conducting pillars with differing conductivities. At one end the columns are mutually connected by so-called bridges made of copper or other materials. At the other end of the columns the bridges are again made of copper or other materials.

There can be foil on both sides of the bridges of thermoelectric elements making up the thermoelectric belt. In terms of further utilization it is necessary for the connecting foils to be as resistant to the effects of the surrounding environment as possible in order for their properties to change as little as possible with ongoing time. These foils can further receive various types of surface finishes.

If one side of the thermoelectric belt or foil is heated to temperature T1 and the temperature of the other side is T2, there will be a division of positive and negative charges in individual thermoelectric elements. If the coefficient of the thermoelectric voltage of the N type semiconductors $s_n$ and of the P type is $s_p$, the thermoelectric Seebeck voltage of the cell will be $$U_S = (s_p - s_n) \cdot (T1-T2),$$

where individual coefficients s are dependent on temperature. According to the Kirchhoff Law it is evident that the total thermoelectric voltage $U_s$ equals the sum of thermoelectric voltage of both pillars.

The Peltier thermoelectric effect is the reciprocal of the Seebeck effect and the thermoelectric cells mediate the delivery of electrical energy and absorb and radiate heat. The semiconducting bodies can be made up of P type semiconductors with perforated conductivity and N type semiconductor with electron-type conductivity. In the mode of Peltier cells there is a current that flows through the thermoelectric structure; one surface absorbs heat from the surroundings and the other radiates heat to the surroundings. In other words the cell pumps heat from one side to the other. The result of the Peltier effect is flowing current that pumps heat. Heat is generated based on the equation for electric Joule's heat $$Q_J = U \cdot I = R \cdot I^2 \cdot t,$$

where
$Q_J$ is Joule's heat released inside the cell with a resistance of R in the course of the passage of current I in the time t. Half of the heat passes to the warm end of the cell and the other half to the cold end. Only half of the heat is considered to decrease the cooling output therefore $$Q_J = \tfrac{1}{2} \cdot R \cdot I^2 \cdot t.$$

Peltier's heat is given by $$Q_P = \alpha \cdot I \cdot t \cdot T2,$$

where $\alpha = \alpha_p - \alpha_n$, is the total coefficient of thermoelectric voltage of the cell and T2 is the temperature of the cooler bridge. The amount of heat transferred from the warm side to the cold side in time t is $$Q_V = \lambda \cdot (T1-T2) \cdot t,$$

where $\lambda$ is the total heat conductivity of the cell ($W \cdot K^{-1}$).

If the side with T2, where is a release of heat, is maintained at the constant temperature of T1, the T1 side will be cooled until Peltier's heat $Q_P$ absorbed by the cell will not equal the sum of heat taken from the surroundings $Q_O$ in the course of the cooling output $P_O$ and heat $Q_V$ transferred from the warmer to colder side and Joule's heat $Q_J$, which is released by way of current passage I through the pillars of the cell. The cooling output of Peltier's cell can be described by the following equation $P_O = \alpha \cdot I \cdot T2 - \tfrac{1}{2} \cdot R \cdot I^2 - \lambda \cdot (T1-T2)$ and Peltier's heat $Q_P = Q_O + Q_J + Q_V$. The introduction of the cooling coefficient of the cell $s = P_O/P$, with an input of cooling cell P and constant Z, which is the thermoelectric efficiency with further amendments of relationships leading to parameter Z, which will depend only on the variables α, λ and ρ, where ρ=1/σ is a unit of electric resistant and σ is the electric conductivity and therefore depends on selected materials. The materials should be of a type where the Z parameter is the largest $Z_{max}=(\alpha_p-\alpha_n)^2/((\lambda_P\cdot\rho_P)^{1/2}+(\lambda_N\cdot\rho_N)^{1/2})$. The present values of $Z_{max}$ are $3\times10^{-3}$ K$^{-1}$ when T=300K.

The Thomson thermoelectric voltage and poles, which travel from the warmer end to the colder also, develop due to the influence of temperature differences. The free electrons are repelled from the warmer end to the colder and take on negative charge. If there is a direct electric current in the thermoelectric cell, the electrons begin moving in the same direction as the temperature gradient and give up excess heat energy at the end thereby causing the warming up. When moving in the opposite direction heat is taken from the surrounding in order for its energy to balance with the surroundings thereby causing cooling. Thomson's heat can be described as $$Q_T=U_T\cdot I\cdot t=\tau\cdot(T1-T2)\cdot I\cdot t,$$

where τ is Thomson's coefficient (V·K$^{-1}$) and is equal to the thermoelectric voltage between 2 spots at the mutual distance of 1 meter under the condition that there is a temperature difference of 1K. Thomson's thermoelectric voltage is given by $$U_T=\tau\cdot(T1-T2)=\tau\cdot\text{grad }T\cdot 1,$$

ΔT/1=grad T where 1 is length.

Together with Seebeck's thermoelectric voltage there is also the development of Benedicks' thermoelectric voltage whose polarity is opposite to Seebeck's voltage; with higher ΔT values this will not growth. This voltage $U_B$ is proportional to the temperature gradient in semiconductor.

The listed thermoelectric effects cannot be described individually. The Seebeck's effect can't be separated from the Thomson's effect because both are dependent upon temperature gradients. Peltier's effect is the reciprocal of Seebeck's effect and therefore a relationship to the Thomson effect is also demonstrated. The maximal efficiency of the thermoelectric generator ζ is given by Carnot's efficiency (T1−T2)/T1 with a temperature efficiency $(1+ZT)^{1/2}/(T2/T1+(1+ZT)^{1/2})$ where T is the absolute temperature.

An important question for the future utilization of energetic potentials of condensers and/or evaporators of refrigerant cooling equipment is the maximization of the Z parameter. Today there are more materials and mixtures available for production that can influence the thermoelectric voltage in a greater scope. This includes solid solutions with additives involving N or P type conductivity. Interesting materials are $(Bi_{1-x},Sb_x)_2(Te,Se)_3$, $YbAl_3$, $CoSb_3$, $AgSbPb_{18}Te_{20}$ and others.

The effect of thermoelectric conversion is utilized in those places where the sun does not shine. This is its advantage compared to photoelectric conversion.

According to this invention thermoelectric elements contained in a thermoelectric belts or thermoelectric foils can be in heat communication with the condenser and/or evaporator energy and therefore with both sides of the heat pump or other cooling or air-conditioning equipment. Electricity is generated based on the temperature differences of tens to about hundred of degrees Celsius. The most advantageous difference in temperature is reached on the condensing side; similar and higher temperature differences are recorded with actively cooled solar collectors in summer period. The system can even be diversified by the surfaces of solar collectors or photovoltaic panels. The active cooling uses the circulation of heat carriers of the heat pumping systems.

The electricity produced can run from the thermoelectric belts or foils through conductors to equipment for a change in polarity; it can be then stored in the accumulator. The entire above-standard module system consists of an electric generator with direct current with a transducer; the module can be supplemented with a monitor for the control of functions.

It is possible to divide the entire circuits into several sectors containing several small compressors that will be switched depending on the needs of the sector in question. The heat pump system can be expanded by the small solar module.

It is possible to produce electricity when the heat collected by solar collectors is transferred from one side of the thermoelectric belt, the other side is cooled. The active cooling is achieved by water, water and additives, other liquids, refrigerants, soil, gas and/or by air. In this case lower temperature T2 is the temperature of the source surroundings, which accumulate heat from the solar collectors. Circulating pumps that supply warm solar filling to the collecting surfaces can be in constant activity even after switching the compressor off. The circulating pump of the solar module is controlled according to the actual temperature of the solar filling; with respect to the lower T2 temperature within the collecting belt, the COP will increase by the heat collected by solar collectors throughout the heating period. The monitor of functions of the generator controls the continuous status of accumulation and correction of functions.

According to this invention another system module is the direct collection of solar and atmospheric heat by way of solar collectors that are located in the surrounding of the outside skeleton, on the roof of the house and/or on the house's outside wall and/or on the Earth surface. Standard flat or tubular collectors can be used for direct heat collection without the production of electricity. If the circulating pump is utilized in the solar system, this pump will be preferentially supplied with the electricity produced by the photovoltaic and/or thermoelectric module.

According to this invention the solar heat is preferentially collected by flat collectors with the following new plate or belt construction. Heat processed tempered glass is selected as a transparent collector cover. The lower surface of the glass, which is not in direct contact with the atmosphere, is coated with a layer that restricts the access of radiation caused by the reflection out of the collector. The actual collecting part of the collector consists of a thin plate made of metal or metal alloy, of plastic or of a mixture of plastics and/or combinations. This plate consists of at least one chamber or channel system that is made by chemical etching, by chip-formation or shaping. The features of the system in terms of the direction and running of channels within the collector collecting plate are evident from the drawings of the invention. If the collecting plate contains more than one channel system, each of which with its own inlet and outlet tubing into and out of the collector, a combination of different collecting media can therefore be used. Such media combinations include refrigerant and a non-freezing mixture of water and additives, refrigerant and gas or a mixture of gases, water and additives with gas or gases, water without additives and refrigerant or gas. A cross-profile of developed channels can be square, rectangular, triangular, circular, semi-circular, oval or multilateral. A thin plate made of metal, glass or plastic is placed on the side of the collector collecting plate following the development of chambers or channels; this plate is attached to the collector collecting plate by welding, gluing or pressing. A thin sandwich-like collecting plate develops, which has the later connection of at least one input tubing and at least one output tubing for the influx and outflow of media. This tubing's embodiment into the input and output channel of the collecting plate is waterproofed and pressure-proofed.

According to this invention this construction with the solar collector differs from flat tubing collectors that use copper tubing of various shapes and are pressed or welded onto the collecting lamellas. According to this invention the optimal heat transfer of collecting media is guaranteed with the chamber or channel system because channels are produced directly in the collecting plate. In this case the transmission of impinging solar radiation occurs by way of transparent cover-collecting plate with medium. In the case of a collector with a thermoelectric belt for the production of electricity the transmission occurs by way of transparent cover—thermoelectric belt—collecting plate with medium. The thermoelectric belt can also be located only on part of the collecting plate surface and not on the entire plate.

The top radiated surface of the collecting plate has a dark coating layer to increase the efficiency of solar radiation collection. This layer can be introduced chemically and by shot-blasting, spraying, plasma, gluing, pressing and galvanizing. If the collector produces electricity based on the utilization of thermoelectric effects, a thermoelectric belt is contact-placed on the top surface of the collecting plate before this dark coating is applied. In this case the dark surfaced coating is applied onto the top side of the thermoelectric belt or foil.

At least two insulated electric or optical conductors are brought out of the thermoelectric belt by way of the collector. The impinging solar radiation will invoke temperature $T1$, which exceeds 100° C. in the summer, on the top collecting surface of the thermoelectric belt or foil. The thermoelectric system within the belt or foil transfers the system temperature $T1$ on the surface of the collecting plate, which is cooled by at least one collecting medium. In this way a lower temperature $T2$, which is necessary for the operations of the solar thermoelectric module, is created on the lower side of the thermoelectric belt. In the course of optimal construction the foil of the thermoelectric belt closes the chamber or channel plate system; this foil is in direct contact with the medium. A frame with filling for desiccant moisture is put on the periphery of the finished collecting plate. A transparent cover, which is preferentially glass, is put on this frame. The whole unit is insulatively closed along its periphery by using waterproof and heat-resistant sealing. Adhesive sealing resistant to temperatures of −30 to +200° C. without a desiccant absorber can be used instead of an aluminum frame. The space that develops between the collecting plate surface and/or thermoelectric belt and the lower flat glass can be evacuated and filled with heat insulating gas in order to decrease the heat losses of the collector even further. Heat insulation is placed on the bottom and the sides of the developed unit. Plates made of polyurethane, polystyrene, foam glass, fiber and mineral waves and/or the combination of these materials are used as heat insulation. Aluminum, stainless plates, steel plates or plastic is used for the bottom cover. Aluminum or plastic profiles are used for boxing the collector casing.

According to this invention a combination of water and non-freezing additives, refrigerant, gas or a mixture of refrigerants and/or a mixture of gasses or the mutual combination of these media will be bused as the working medium of the solar collector. According to the described construction collectors will be operated preferentially either traditionally with the circulation of one heat transfer medium and/or dually with the circulation of two different media or with the circulation of one medium with a thermoelectric belt and/or with the circulation of two different media with a thermoelectric belt. The collectors can be positioned either in series, parallely or in series of parallel collectors. The attachment of the collectors does not differ from the assembly of traditional flat collectors, which means onto the constructions of open-air space, onto roofs, onto roof coverings or onto the house's wall. A lower thickness of the collector with internal construction without the use of traditional collecting tubing seems to be an advantage. According to this invention solar systems with collectors could be operated as systems with large flow, with low flow, and with adjusted flow, with a drain back system or with the combination of the described flows; for instance in the course of dual utilization of different media. A drain-back system assumes the utilization of water with the possibility of releasing water into the retaining tank. The method of operations that were selected can be adjusted to the chamber or channel system within the collecting plate and to its profile.

According to this invention in terms of the operational connection with the heat pump the collectors surface has been proposed smaller with respect to the actual needs of solar heat supplements and with respect to the volume of the accumulation tank. According to this invention the geothermic heating and cooling apparatus is the dominant heat source of energetic equipment. In the seasons when the sun shines solar collectors are capable of quickly securing pre-heating of warm water as well as tempering the temperature of pool water. With respect to the heat pump solar collectors can secure a supply of supplemental energy to the collectors, can increase the COP of the system and can aid in increasing the temperature differences for the eventual production of thermoelectricity. The production of electricity with this type of solar plate collector construction can even take place directly on the surface of the collectors.

According to this invention another construction of flat solar collectors exists where the described collecting plate with a channel or chamber system has the attachment of photovoltaic cells on its surface. The efficiency of the photovoltaic cells is highest in the winter. The selected medium for collecting plates, including refrigerant or mixtures or water with additives, for this construction simultaneously cools the collecting plate and therefore improves and maintains the conditions for the activity of photovoltaic belts or foils in summertime.

According to this invention the connection of cold water can be implemented by way of a branch pipe from the main water tubing that is made outside or inside house; the connection is preferentially onto the heat exchanger of the outside accumulation tank or directly onto this tank. In this way the warm water for the supplying of the house is pre-heated by the solar collector medium and heated up in the boiler inside the house. The function of connection of the water onto the outside tank is advantageous when implementing the solar module. According to this invention the module of multifunction outside tank can also include the heating of pool water from the solar module or from the compressor directly within this tank or by way of the heat exchanger.

In summary a new system of heat collection has been implemented according to this invention that uses belt and/or plate exchangers for extracting and transferring the heat produced within the heat pump or cooling apparatus with the possibility of expanding the basic system by the described above-standard modules. The lay-out of the entire modular energetic apparatus is evident from the drawings of this invention.

BRIEF DESCRIPTION OF THE DRAWINGS

Drawing 1 shows a home heated by energetic apparatus according to this invention. The equipment is based on the plate and/or belt method of the collection of soil subsurface heat and is supplemented by above-standard modules.

This is a module exhibiting controlled ventilation of the house. The tubing of the ground air exchanger is parallely divided and is placed into prepared soil trenches together with the collector. In the heating season the temperature of the interior air is about +20° C., which is forced into half or part of the ground exchanger, which is the location from where the energy for heating is taken from. The other half or part of the exchanger inhales cold outside air for ventilating, which is partially preheated by the ground in this way in the winter season. During the operation of the controlled ventilation module, both halves of the exchanger are regularly and cyclically switched by a controlling regulating mechanism inside the house. The air flows inside and outside the house by way of channel distribution.

Figure 1:
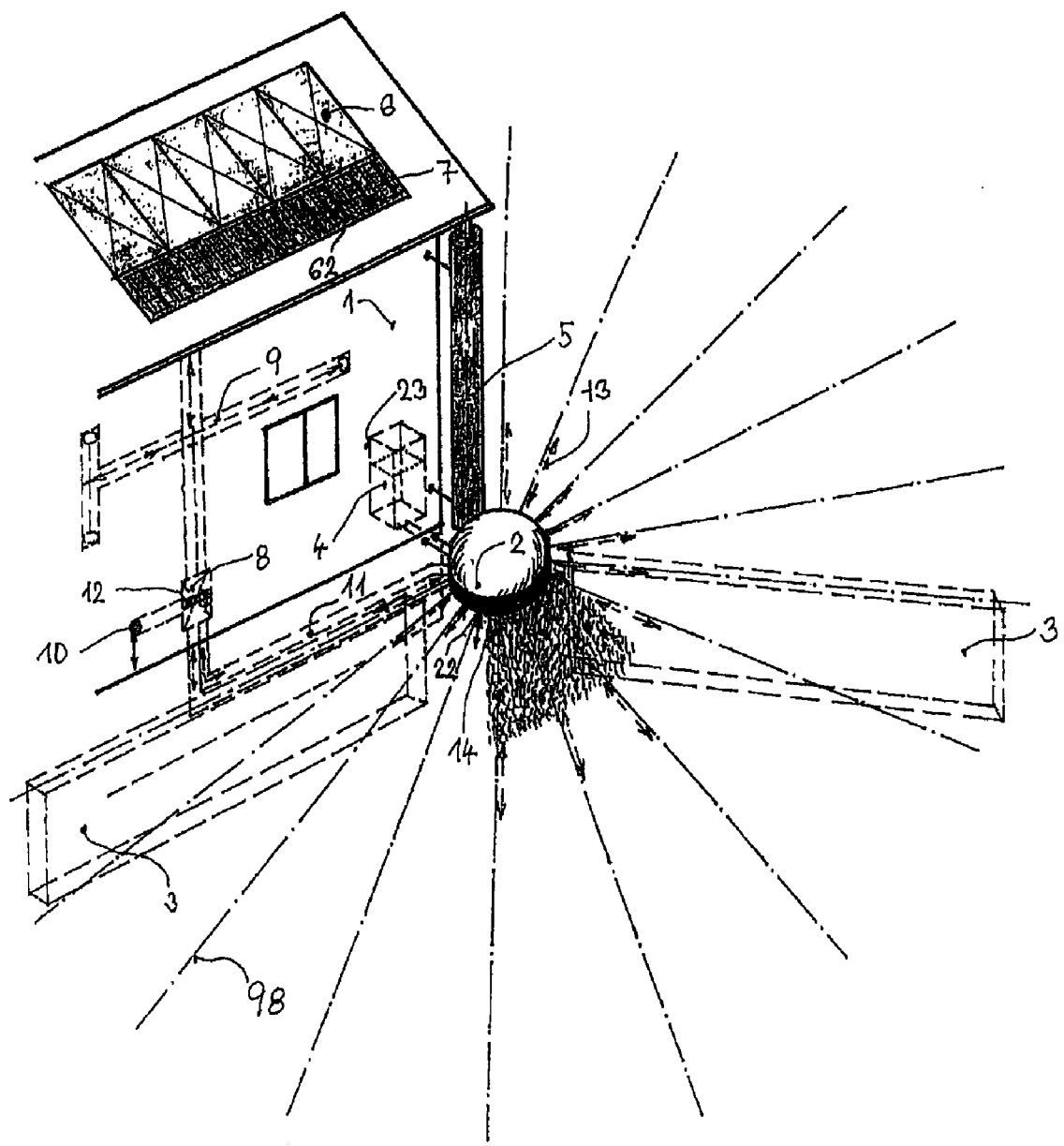
Figure 6:
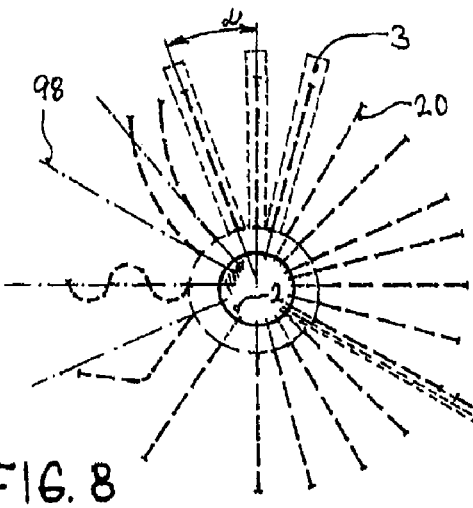
Figure 7:
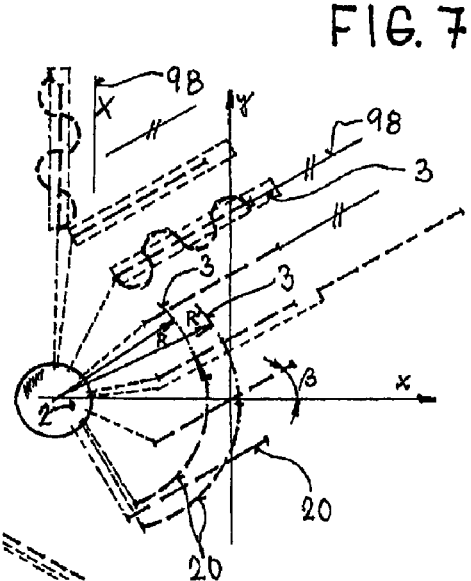
Figure 8:
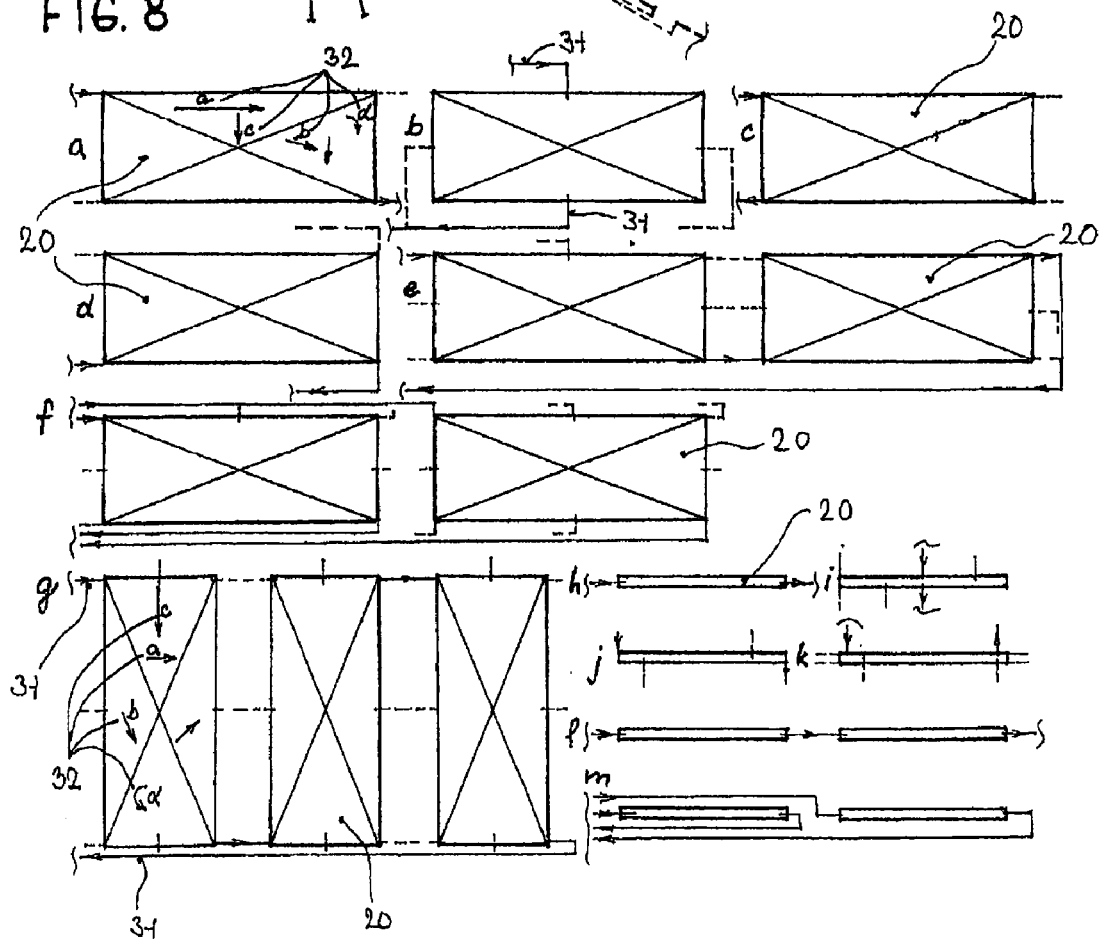
Figure 13:
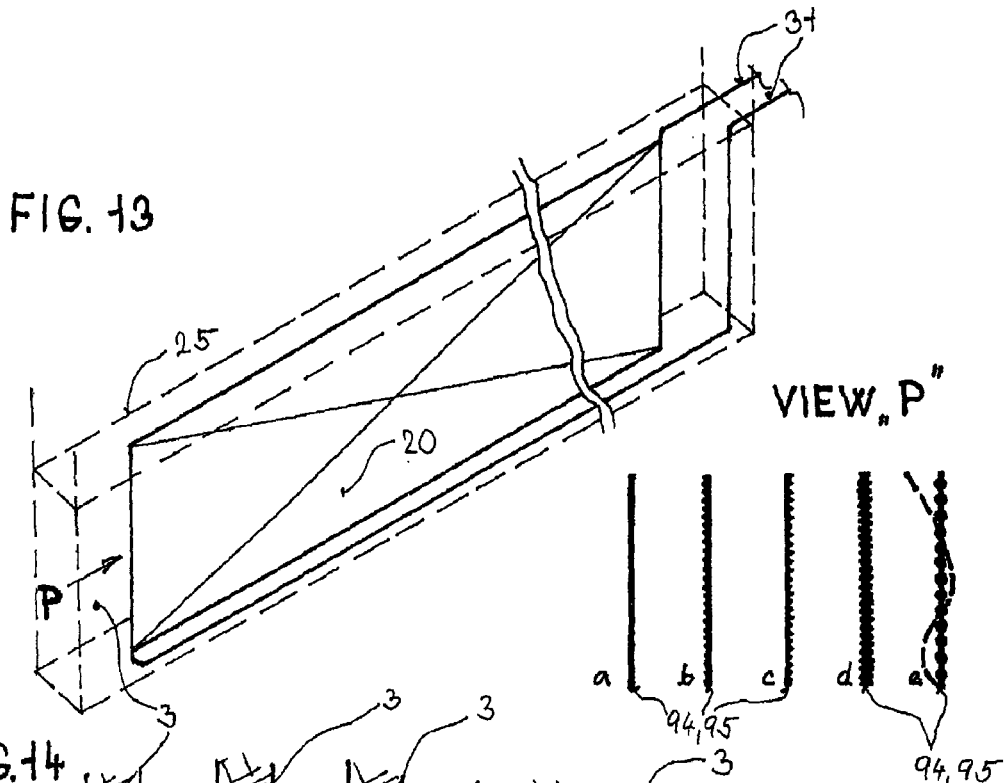
Figure 14:
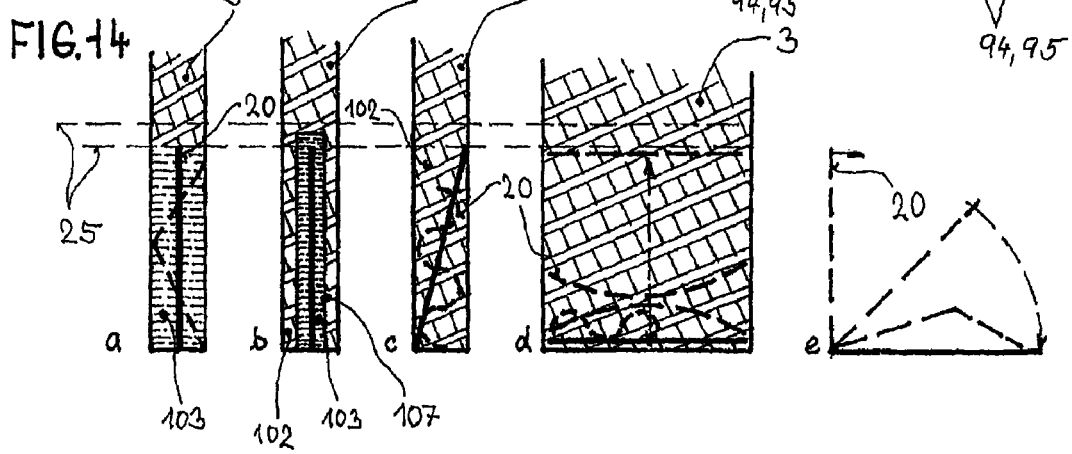
Figure 15:
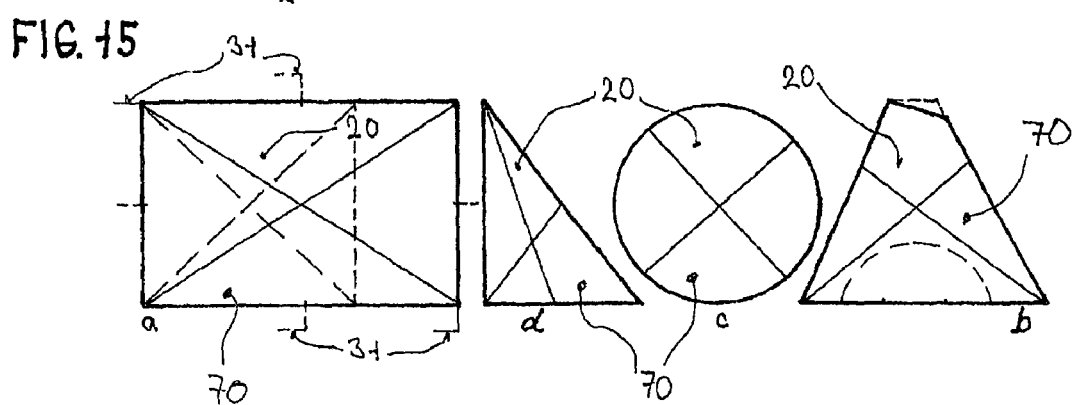
Figure 16:
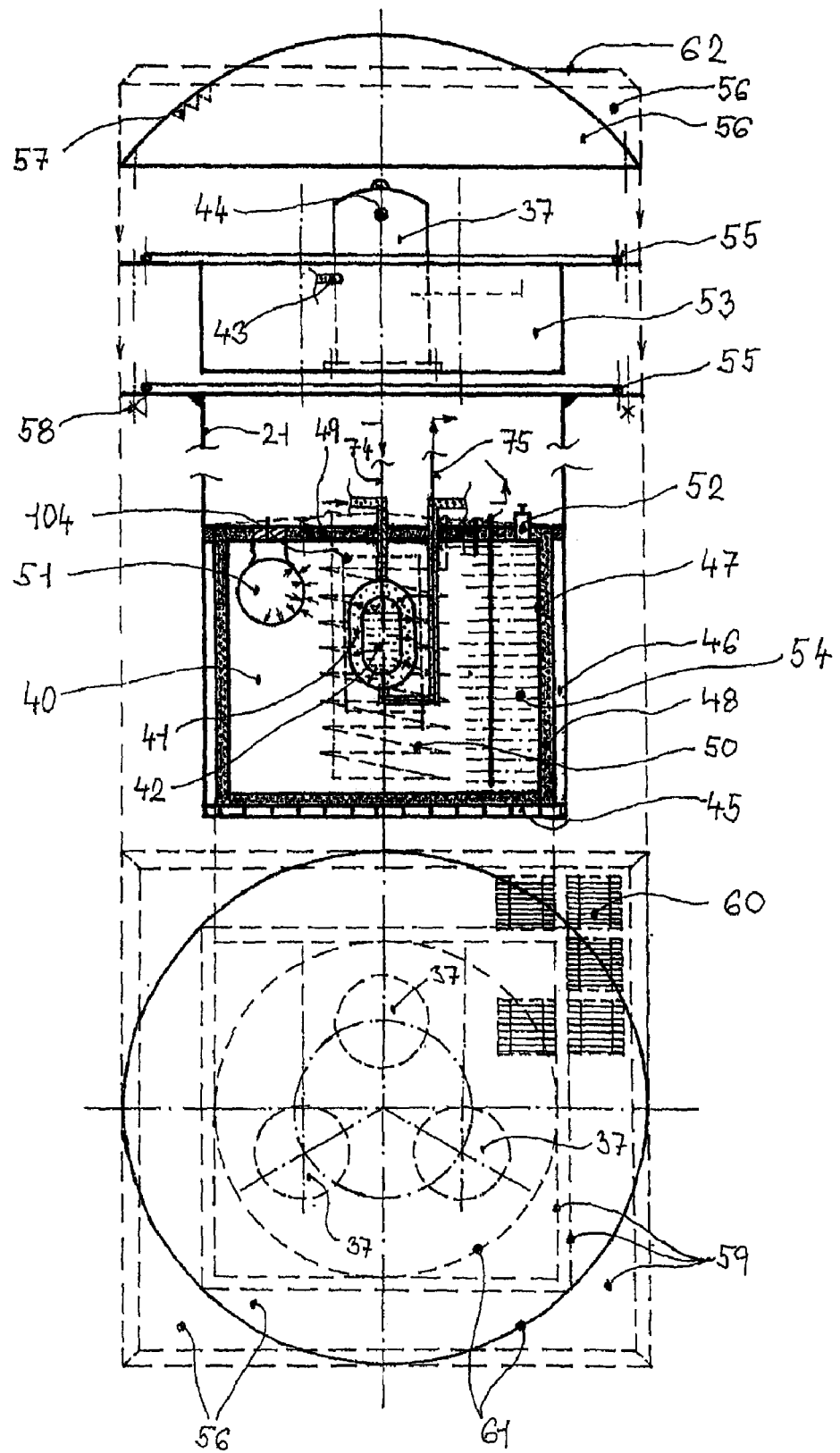
Figure 17:
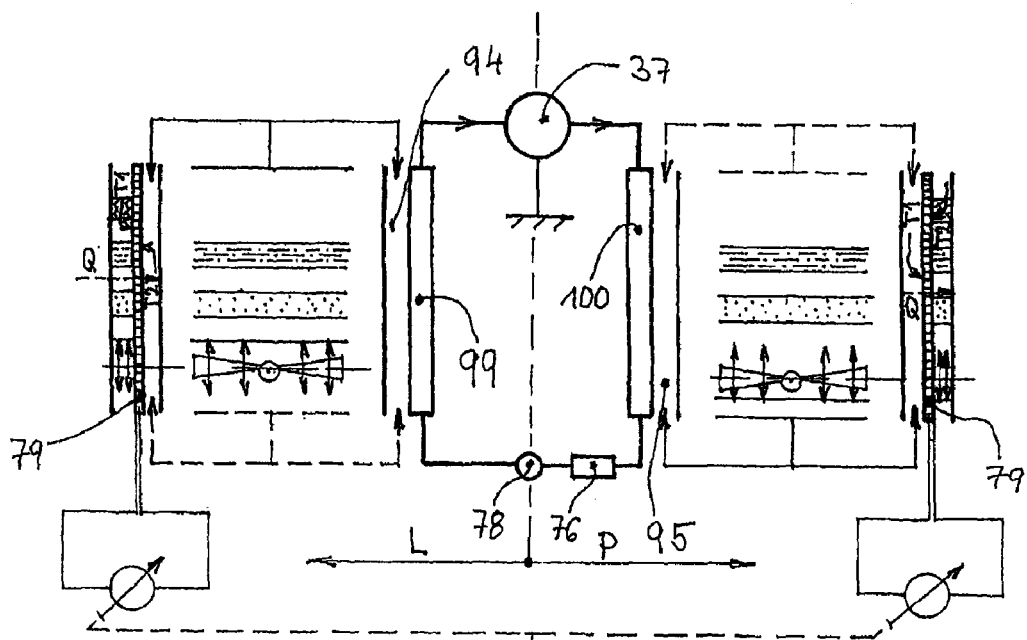
Figure 18:
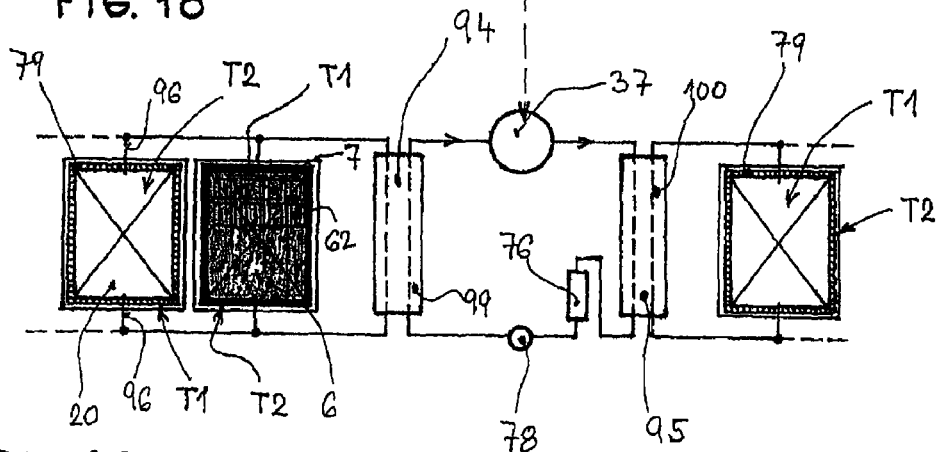
Figure 28:
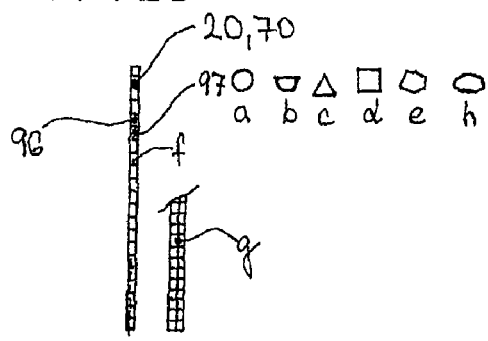
Figure 19:
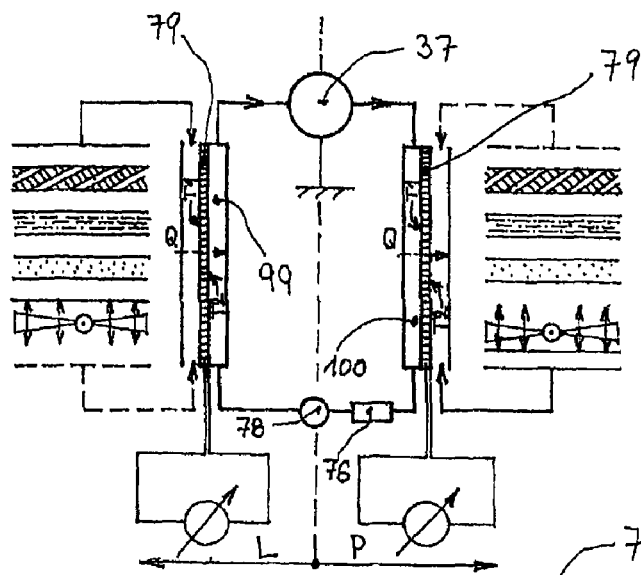
Figure 20:
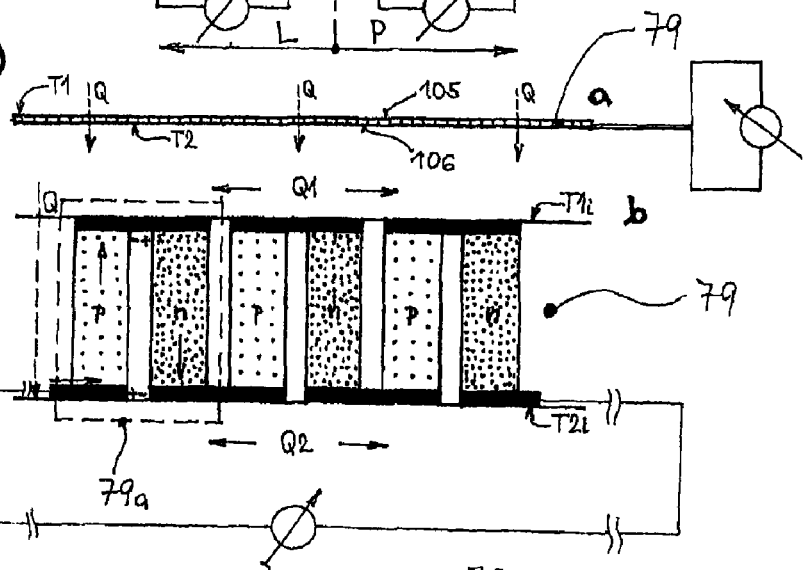
Figure 21:
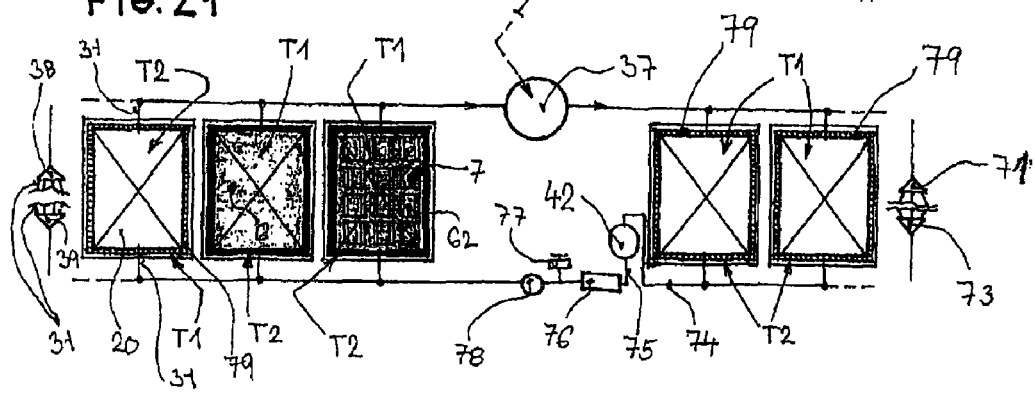
Figure 22:
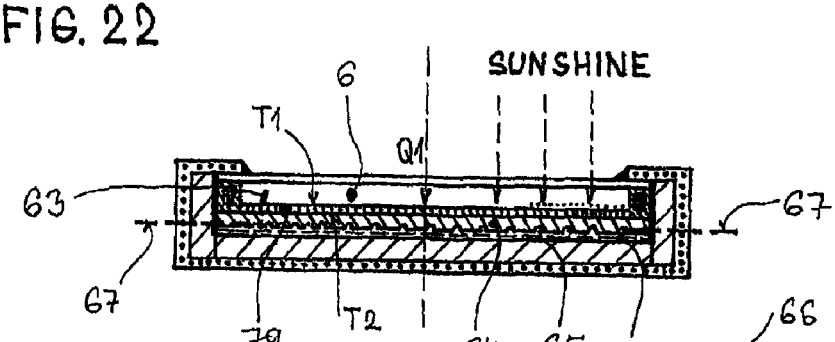
Figure 23:
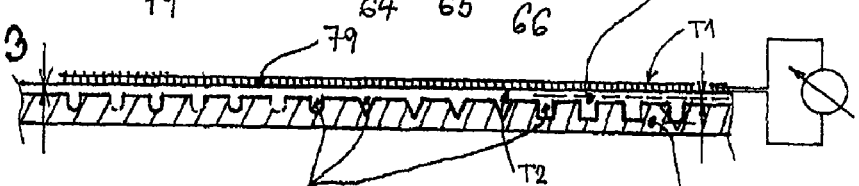
Figure 24:
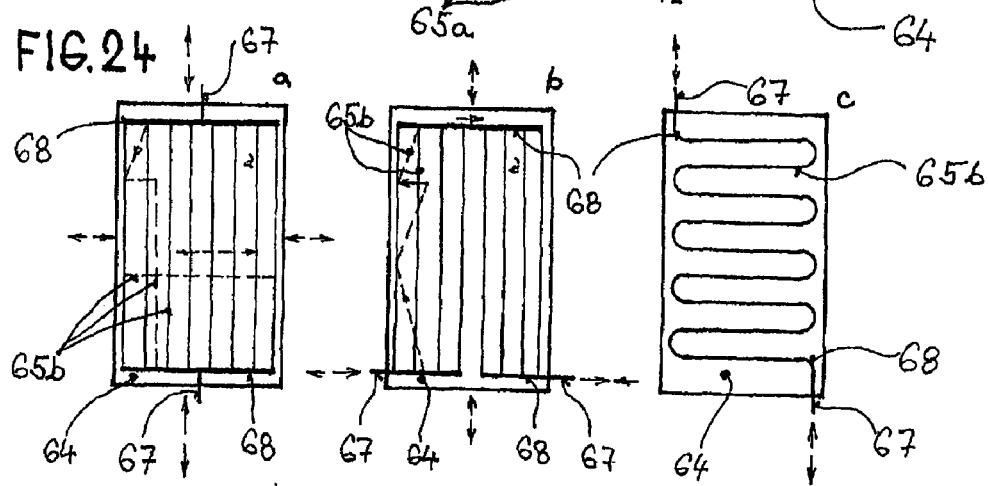
Figure 25:
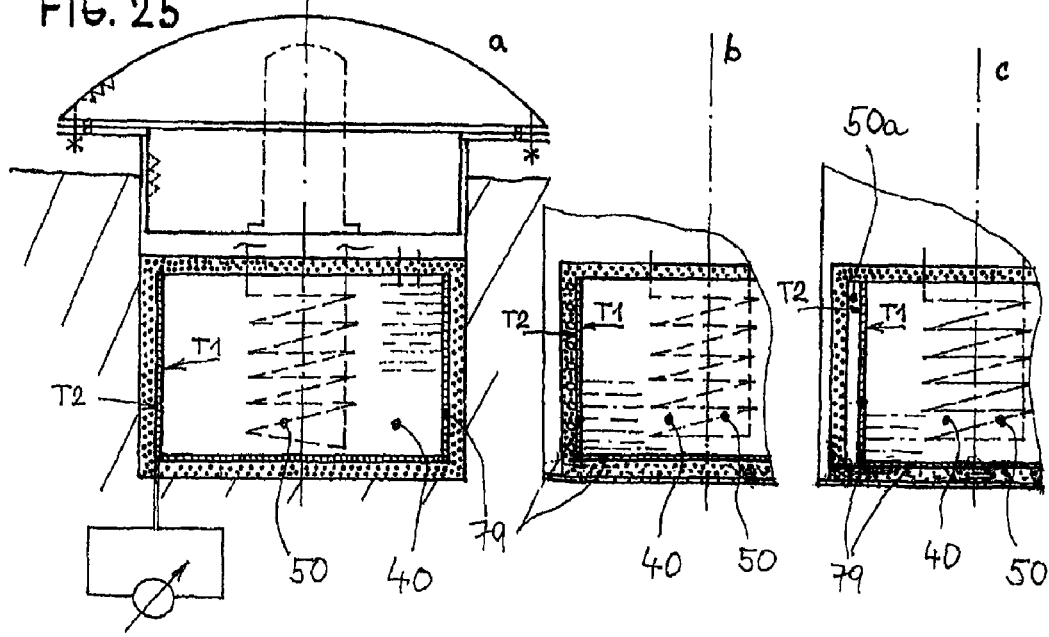
Figure 26:
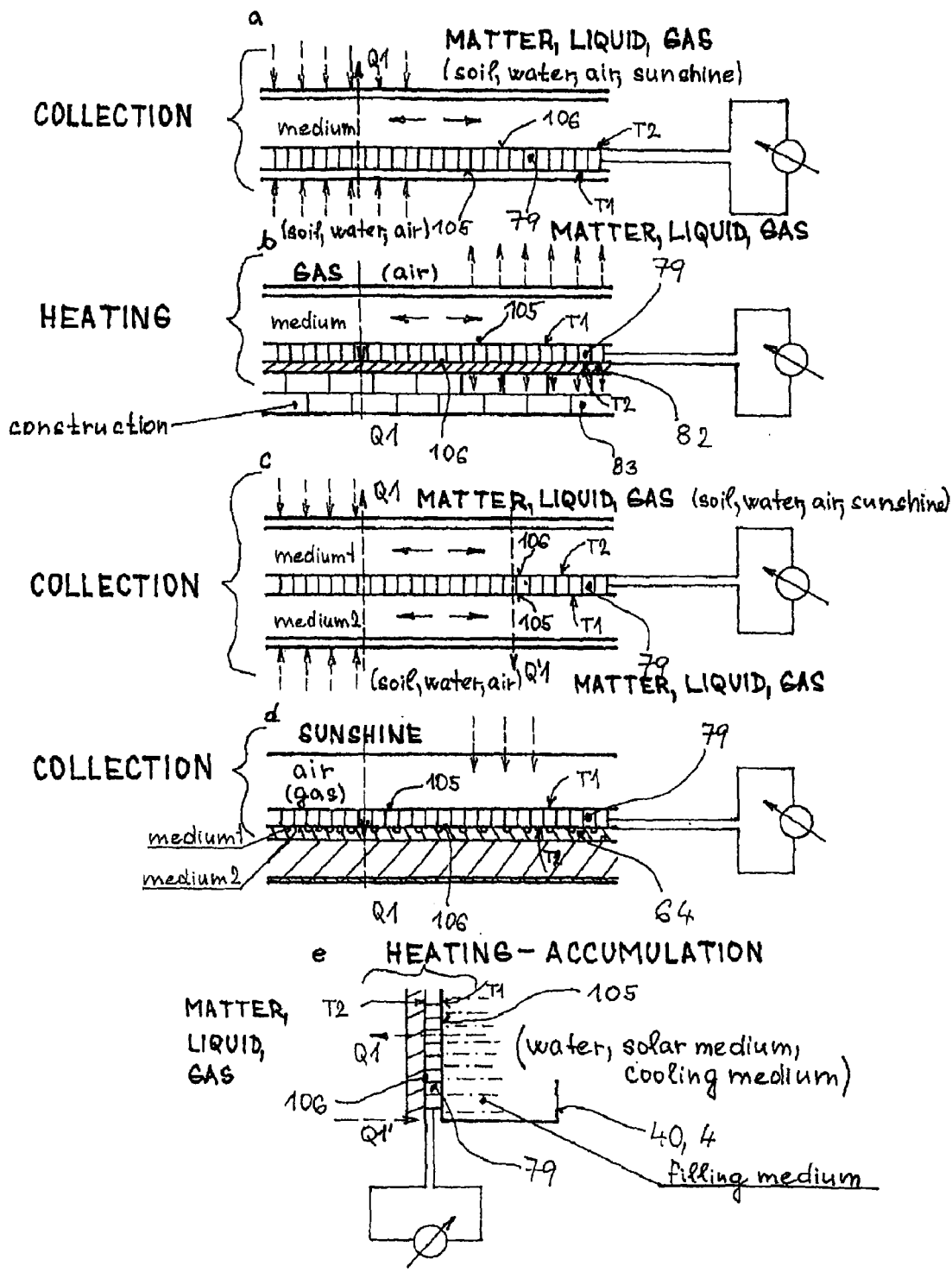
Figure 27:
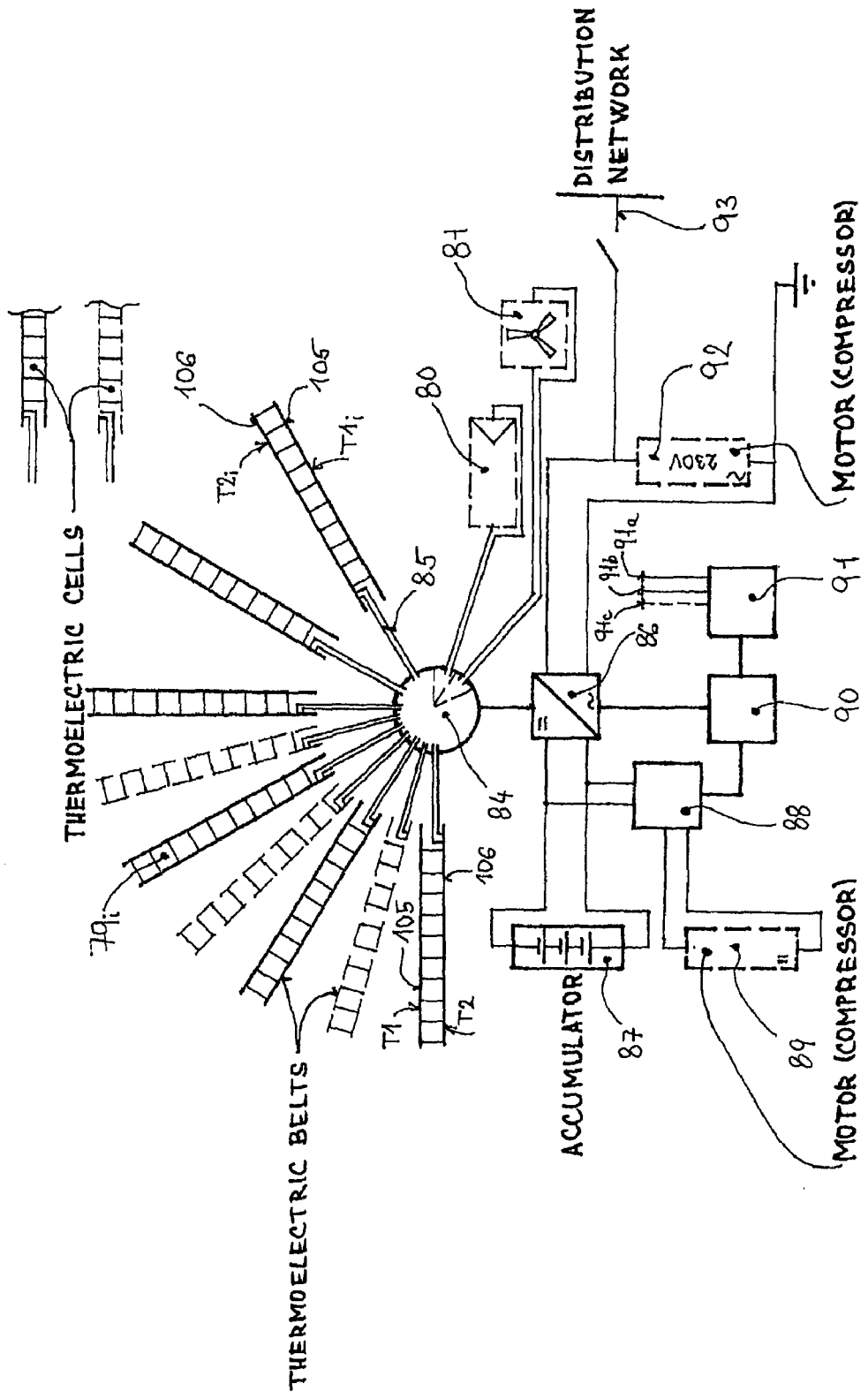

Another module is the accumulation tank located in the outside skeleton. With its integrated functions, this tank is in systematic communication with a solar circuit and by way of a heat exchanger also with an inside boiler for warm water and by way of mutual exchange of warm refrigerant to cold refrigerant also with a refrigerant circuit of the outside or inside heat pump.

Another module is the electricity production for the actual supply of the apparatus based on the principle of thermoelectric effects in the course of utilizing the energetic potential of heat pump condensers and/or evaporators, the energetic potential of solar radiation and solar media. This module can be expanded by the photovoltaic production of electricity.

Drawing 2 shows the outside skeleton of the system with the belt collecting bodies wrapped. Under the lid of the skeleton the top distributing manifold of the ground air heat exchanger and filters are attached to its casing. The skeleton and heat exchanger are placed on a palette for transport to the implementation location. If the ground collector is produced of chamber plates, they are positioned on top of one another or theses plates and can be transported on a palette tagged together. There are shorter sectors of plastic plates on the length of the palette of those mutually tagged together whereas several of these sectors are mutually interconnected for example by tubing.

Drawing 3 shows a trencher that is appropriate for the quick excavation of narrow soil trenches for the new heat pump collectors. Mini excavators are also appropriate for excavating the trenches. The second trench in the picture is a ground collector equipped with a plate or belt; the drawing also shows the branche of air ground exchanger; the trench is filled with the excavated soil or filled with sand. The interrupted line indicates the possible position of a country area frost line.

Drawing 4 shows the drainage distribution of a water, which is brought by the tubing to the circular distributing manifold, which is lodged under the surface around the skeleton. Individual perforated plastic tubing runs from the distributing manifold. This tubing is inserted into drainage tubing of a larger diameter. The function of this drainage tubing is to protect the perforation of the inside tubing against soil or sand. The system of underground irrigation by rain water is here most efficient. Water is transported and quickly distributed by the irrigation system with a small loss of pressure. Water is taken down directly from the roof of the object to the individual arms of the ground collector and/or to the facade exchanger-tank and/or to the underground heat-insulated tank.

Drawing 5 shows a cross-section of one parallel shoulder of the outside part of the installation of the collecting system according to this invention. This shows a belt or plate collector of a simple or sandwich construction. There is tubing in the soil trench for the gravity inclined solid air exchanger embodied into the lower divided distributing-collecting manifold. The air tubing can offer the outflow of condensate preferentially to sewage by way of tubing with a backflow valve. An alternative method is to lead the condensate to the subsoil of the skeleton or to use a pump. The drawing also shows air well insulated tubing of a larger diameter connected onto each half of the lower distributing-collecting manifold, which interconnects the ground air exchanger with air controlled mechanism found inside the home.

Drawing 6 shows various ways of radially arranging soil trenches for collecting plates and/or belts. Various angle spacing of soil trenches either straight or tortuous depending on the manipulation of the ground machine is possible. A dot and dash line indicates the spacing of the imaginary trenches; an interrupted line indicates the individual collectors. It is advantageous to use influx and return tubing of the same length from the outside skeleton. The trenches are arranged in a circular sector or in wedge angle, in a circle or circles. The placing of several collecting bodies one after the other in a long soil trench is also shown.

Drawing 7 shows the parallel or trapezoidal layout of soil trenches of collectors surrounding the outside skeleton. The contour line or radiused layout of trenches is also possible. This is non-radial layout of collectors within the lot.

Drawing 8 shows various ways of connections or interconnections of heat transfer plates and/or belts. The arrows inside the bodies indicate the possible direction of media flow according to channels or chambers. Drawings 8a to 8d show the options of the interconnection of lateral connecting influx and return tubing to the heat exchange body. Drawings 8h to 8m are shown from the top view. Drawing 8e shows plates and/or belts coupled together in series by tubes. Drawing 8f shows lineal positioning of plates and/or belts without being coupled together in series. Drawing 8g shows vertical positioning of mutually interconnected heat transfer bodies. The bodies shown in picture 8 are either in simple or sandwich construction.

Drawing 9 shows one belt/plate collecting body of a simple or sandwich construction with influx and return tubing in the trench. The arrows show the various directions of heat transfer media flow through the body.

Drawing 10 is the inside heating system made of heat belts and/or plates with influx and return tubing. Individual tubes are attached onto distributing manifolds and collecting manifolds, which are not shown in the drawing. Heating belts and/or plates can be positioned on the walls, ceiling or on the floor of the room. It is also possible to position these plates and/or belts into the construction, which is under structural surface. The arrows show the various directions of heat transfer media flow within individual heat transfer bodies according to distribution channels or chambers.

Drawing 11 shows the utilization of resolved plate construction in the solar collector. The arrows show the various directions of the flow of at least one media inside the collector collecting plates.

Drawing 12 shows the cross-sections of preferential constructions of collecting and/or transferring plates and/or belts and solar collectors. Drawing 12a shows a cross-section of a chamber plate or belt preferentially from one material. The construction from more materials and/or from more layers is also possible. Various shaped profiles of internal chambers or channels are possible. The surface can be further amended with appropriate coatings. Drawing 12b shows a construction with its core consisting of a metal foil or metal alloy foil. An layer containing a distribution channel system is attached to this foil either directly or by way of a thin contact interlayer. An covering protective layer is also on the other side of the metal foil. Drawing 12c illustrates the metal foil core being substituted by a thermoelectric belt, which already contains an external metal foil. Drawing 12d shows that the other side of the thermoelectric belt has a plate or belt, which by way of a solar media brings heat from solar collectors. It is possible to resolve the solar sides of a thermoelectric belt in the same way as with the side of collection. This method is shown by the bottom layer that was drawn in additionally. This possibility of an additional solar layer for instance is possible for the models shown in drawings 12a and 12b. In drawing 12e the construction is based on a thicker plate, which has had individual chambers or channels built-it; the surface of these chambers or channels is coated with metal or plastic foil. The outside sides are layered with a protective foil or with another kind of layer. This type of plate construction is even used for solar collectors according to this invention. Drawing 12f shows that one side of the plate is similar to the model shown in drawing 12e located on a thermoelectric belt. This thermoelectric belt can be also used as a layer, which is attached and covers the developed channels.

Drawing 13 shows a collecting body, plate and/or belt in the profile in wiev of P. Drawing 13a shows a collecting body, which is practically smooth on both sides. Drawing 13b and c are unilaterally shaped, 13d and e are bilaterally shaped and drawing 13e shows waving.

Drawing 14 shows the possible positioning and view design of the collecting body in the soil trench. The interrupted horizontal line shows the possible position of the frost line. Drawing 14a shows a collecting plate or belt, which is either straight or in fracture surface with filler of a matter with better heat conductivity than the surrounding soil. The filler matter is in direct contact with the surrounding soil. Picture 14b shows a collecting body in case made of plastic and/or metal for example. Inside the case the collecting body is again surrounded by filler matter with better heat conductivity than the surrounding soil but this filler matter is not in direct contact with the surrounding soil. The filler matter is able to accumulate and store the influxed solar heat well for example. Drawings 14c, d and e show various different positions and profile design of the collecting body in the ground trench.

Drawings 15 a, b, c and d show various shapes of heat transfer plates and/or belts. The quadrangle shown in drawing 15a is the preferential shape, which is displayed as a rectangle or square.

Drawing 16 shows an outside skeleton of the modular energetic apparatus in various designs according to this invention. It is made up of three basic parts. The first part contains a top removable lid preferentially of a convexo-concave or straight shape, which can be heat-insulated from the inside. The lid bears on the sealing of the removable plate, which is displayed with a central embodiment in this drawing. The space between the skeleton lid and the removable plate is waterproof and closable by way of the sealing and screws. For example the plate can carry at least one compressor and other technical components. The plate can be extracted with its components following disconnection of the work circuits and then taken for servicing. After extracting the plate the skeleton is still waterproof closable by way of the lid. The plate is placed over the sealing on the bottom supporting part of the skeleton. In this way the bottom space within the skeleton will also be waterproof. The space within the bottom skeleton is used for distributing manifold and collecting manifold of collecting plates and/or belts. This drawing also shows the positioning of a heat-isolated multifunctional accumulation tank in the bottom part of the skeleton. The tank is placed on a plastic grid and has an air space around the insulation that can be evacuated and filled with insulation gas. The ground plan of the skeleton and lid indicates a preferential shape of a circle or quadrangle. The angular shape without further bevels are illustrated by the interrupted line. A photovoltaic module for the electricity production can be integrated onto the lid. This electricity is used to preferentially supply a circulating pump of a solar circuit accumulation tank.

Drawing 17 shows the utilization of the work circuit of the cooling equipment with a compressor where the heat energy of the condenser and/or evaporator is transferred by a heat transfer media and is used for the production of electricity based on thermoelectric effects according to this invention. The heat transfer media as gases and/or air can be transported by a fan, by a compressor or thanks to a pressure difference. The possible heat transfer media are displayed in the pictograms: dots display gases, both side arrows display air or gas powered by a fan or compressor or thanks to a pressure difference, dot-and-dash lines display liquids. In the case the water and/or antifreeze based liquids are used, a circulating pumps will be used in heat pump systems. The circulating pumps are not drawn in this drawing. The heat sources are a heat energies accumulated in a solids, fluids and gases. The possible heat sources are displayed in smaller pictograms next to thermoelectric layers: dots display gases, both side arrows display powered air or a gas, dot-and-dash lines display liquids, irregular gratting displays solids. The soil can be the solid in the case of residential heat pumps; a water or waste water can be the liquid; an outside or inside air can be the gas. The food and/or drinkables can be the solid and/or liquid in the case of freezers and refrigerators. The interrupted line from the exchanger indicates the opposite direction of media flow in the case of a reverse work cycle.

The heat transfer media is in contact with the surface of thermoelectric belts/layer thereby developing system temperatures of T1 and T2 on these belts. Solid substance, liquids, gases and air are referred to in this media. The heat flow of thermoelectric belt Q is always in the direction of a warm environment to a cooler one. The linkage of thermoelectric belts to the circuits brings on an electric voltage $U_S$ at various T1 and T2 system temperatures in the cells of the belts.

Drawing 18 schematically shows the same cooling equipment work circuit as was shown in drawing 17. The heat transfer media transfers the energy of the evaporator and condenser to the collecting and supplying heat transfer plates and/or to belts with construction according to this invention. The connection onto actively cooled solar collectors with a surface integrated thermoelectric belts and/or with integrated photovoltaic cells is also illustrated. T1 and T2 system temperatures are also illustrated. On the sides of the work circuits can be also a fan for air types of heat pumps. Similarly types of connections with fans are used in other refrigerating machinery. In the case the water and/or antifreeze based liquids are used, a circulating pumps will be used in heat pump systems. The circulating pumps are not drawn in this drawing.

Drawing 19 shows the utilization of cooling equipment work circuit with a compressor where condenser and evaporator heat energy is directly utilized for the electricity production based on thermoelectric effects. The heat from a compressor work circuit is transferred by a refrigerant to the surface of thermoelectric belts. The heat sources are a heat energies accumulated in a solids, fluids and gases. The possible heat sources are displayed in pictograms next to thermoelectric layers: dots display gases, both side arrows display powered air or a gas, dot-and-dash lines display liquids, irregular gratting displays solids. The soil can be the solid in the case of residential heat pumps, a water or waste water can be the liquid, outside or inside air can be the gas. The food and drinkables can be the solid and liquid in the case of freezers and refrigerators. The interrupted arrows indicates the opposite direction of media flow in the case of a reverse work cycle.

Drawing 20*a* shows a thermoelectric belt/layer containing a thermoelectric structure, which is connected to a closed circuit. The heat flow Q through the belt/layer generates electric voltage $U_S$. Drawing 20*b* thermoelectric belt containing thermoelectric cells with varying conductivity of P and N-type semiconductors. T1 and T2 system temperatures arising from varying Q1 and Q2 heat potentials from the contact surroundings of the belt are also illustrated.

Drawing 21 schematically shows the same cooling equipment work circuit as was shown in drawing 19. The compressor media transfers the energy directly to the collecting and supplying heat transfer plates and/or belts with a flat construction according to this invention. The drawing illustrates T1 and T2 system temperatures, integrated thermoelectric belts and distributing manifolds and collecting refrigerant manifolds for the connection of individual evaporators and condensers. The drawing also illustrates the connection to an actively cooled solar collectors with a surface integrated thermoelectric belt and/or with integrated photovoltaic cells. The drawing also illustrates the basic parts of the cooling circuit including the compressor, refrigerant tank, dehydrator, electromagnetic valve and at least one throttling element such as a valve or a nozzle. On the sides of the work circuits can be also a fan for air types of heat pumps. The fans are displayed in pictograms with both sides arrows. Similarly types of connections with fans are used in other refrigerating machinery.

Drawing 22 shows a cross-section of the solar flat collector construction according to this invention. A thermoelectric belt with a dark surface finish is attached to the internal collecting plate with channels for at least one circulating medium and for the active cooling.

Drawing 23 shows a cross-section of the collecting plate from a solar collector similar to drawing 22; the difference is that the thermoelectric belt directly closes the channels of the medium and has a dark collecting surface finish. Connecting layer can be inserted between the belt and plate. Various profiles of channels including round, triangular, square, rectangular, angular, oval and compound are illustrated.

Drawings 24*a, b* and *c* show various kinds of channel distribution and flow by way of the solar collector.

Drawing 25 shows the outside skeleton with an integrated accumulation tank with at least one interior and/or exterior tube and/or cladding-type heat exchanger and thermoelectric belts. Heat insulation completely fills the skeleton around the tank or it has insulation gaps around it.

Drawings 26 *a, b, c, d,* and *e* illustrate the future possibilities for electricity production by way of thermoelectric belts for heat pumps, cooling equipment, air-conditioning equipment and for heating and accumulation in tanks. The surroundings from which the heat is collected and/or transferred is briefly illustrated. Media for drawing a, media 1 and 2 for drawings b and c are thought to be refrigerants and refrigerant mixtures, water and water mixtures and additives. The same media 1 and 2 apply for drawing d, which is for solar collectors. Drawing e illustrates the utilization of heat energy in the course of accumulation or the heating process.

Drawing 27 shows the schematic connection of the electric generator. The connection of photovoltaic modules and/or an alternate generators is also possible. Electricity can be stored within the accumulators and/or the system is also connected onto a distribution network. Direct current or alternate current are connected advantageously to at least one compressor and/or to other motor(s) and/or the electric part(s) in this case.

Drawing 28 on the drawing page 7/11 shows the profiles of chambers or channels inside the heat exchange collecting and supplying heat transfer plates and/or belts. The possible options include a circular, b semi-circular, c-triangular, d-square, e-angular, f-rectangular, g-compound and h-oval.

DETAILED DESCRIPTION OF THE PREFERRED EMBODIMENTS

Example 1 describes the utilization of the collecting system and the transfer of heat energy with modular heating and cooling apparatus according to this invention. Considering the individual above-standard modules that mutually support one another in terms of constructional and operational energetic many drawings have been used. Drawing 1 shows house 1 with outdoor equipment 2 and with a system of soil heat collection by way of plate and/or belt collectors located in soil trenches 3. In this case the soil trenches have radial arrangement of trenches according to drawing 6. The trenches are excavated by using a trencher 24. The system is functionally interconnected with the indoor boiler 4 for the heating of water. There can also be interior equipment 23 with compressor-like parts, which is described by the heat pump system inside the house 1. There are solar collectors 6 located on the roof of the home as well as layer-barrier photocell modules 7 as possible supplements. Inside the house there is an air distribution system for controlled ventilation 9, which is connected onto the controlled ventilation control mechanism 8, which contains replaceable dust and smell filters. By way of a control flap the control mechanism 8 has integrated branching through a ventilation hole 10 in the wall for direct contact to the outdoor atmosphere. The controlled ventilation control mechanism 8 is interconnected by two underground insulated air tubing 11 that are individually ended in both halves of the bottom distributing manifold and collecting manifold 16 of the shoulder of the ground air exchanger 19 shown in drawing 5. The bottom distributing manifold and collecting manifold 16 can have tubing 17 preferentially built in that has a backflow valve for the gravitational drainage of condensate from the air tubing 19. It is also possible to have infiltration of condensate 18 under the bottom part of the skeleton 21. Individual shoulders of ground air exchanger 19 are preferentially lodged in the same soil trenches with soil collector plates and/or belts. The plates or belts of soil collectors are lodged with respect to the country area frost line 25. The shoulders of the air ground exchanger 19 can also be in self-contained trenches. In both cases they are ended in the top divided distributing manifolds and collecting manifolds 14, which lead up to the top aboveground border of the bottom part of the skeleton 21. Distributing manifold and collecting manifold 14 contain replaceable dust and smell filters 22 and can be divided into two halves based on its volume. Air distributing manifolds and collecting manifolds 14 and 16, exchanger shoulders 19, connecting tubes H, air control mechanism 8, ventilation whole 10 and air distribution system 9 make up the controlled ventilation module of the house. Together with the collecting plates and/or belts 20, which are connected by the influx and return tubing 31 to the distributing manifold and collecting manifold inside the skeleton 21. In this case predominantly heat transfer media based on CFC-free refrigerant preferentially flows horizontally 32*a* within the installed plates and/or belts 20. Drawings 12*a* to 12*d* show constructional varieties of plates and/or belts 20 that are universally usable for any heat transfer media. In the case of CFC-free refrigerants option 12*b* is preferred, as the belt is made of thin metal foil 33. A channel layer 34 containing a channel or chamber system for refrigerant distribution is attached to this foil. The surface of metal foil 33 is treated with a covering layer 36 whose edge is connected to a channel layer 34 and can also have a contact connecting layer 35. A chamber plate 12a with or without surface finish and plate 12e are also possible. Refrigerant and other heat energy from the surrounding soil, which can be endorsed by exhaust interior air, vaporizes within the vaporization belts 20; refrigerant vapors are aspirated by at least one compressor 37 by way of collecting manifold 38 shown in drawing 21. Collecting manifold 38 and distributing manifold 39 of heat transfer media is preferentially found in the skeleton 21 shown in drawing 16 in the location above the accumulation tank 40; the manifold is not illustrated. Distributing manifold 39 and collecting manifold 38 of the collecting belts and/or plates can also be outside the skeleton in the soil. The refrigerant vapors from the collectors 20 flow into the tank 41 shown in drawing 16, which contains a second tank 42 with warm liquid refrigerant. This is where heat is withdrawn from liquid refrigerant and at least one compressor 37, which is located on a removable plate 53 together with other components, begins suction 43 from the collector and tank 41. The compressor compresses the vapors, which exit by way of tubing 44 into the house the shortest way possible. The system therefore involves an internal transfer of heat from warm refrigerant to cold refrigerant by an exchanger of the type tank 42 within a tank 41, which could even be replaced by an exchanger of the tubing within a tank or tube within a tube types when there is a smaller amount of refrigerant in the system. The system equipment also has an accumulation tank 40 located directly inside the skeleton 21 and this tank belongs to another above-standard module of the system. The tank is insulated and separated by a plastic grid 45 from the bottom as well as by an air space 46 from the skeleton wall 21. The cladding of the tank 47 is heat insulated by way of insulation 48. Screws are fastened to the input entrance 49 in the top part. The tank also contains at least one tubular heat exchanger 50 for the heating of water for example. The tank can also have a built-in expansion bag 51, a safety valve 52 and a deaerator. The addition of such an accumulation tank 40 into the system assumes the interconnection of a smaller solar circuit. The tank then contains non-freezing mixture of water and additives 54 for solar collectors. The supporting plate 53 is partially embodied into the skeleton 21 by way of the bottom sealing 55 and is covered by the lid 56 by isolative insulation 57. The lid 56 is fixed by screw fittings 58 on sealing 55. The shape of the lid 56, skeleton 21 and tank 40 is preferentially circular 61 according to the ground plan. An angular shape 59 is possible as well. It is possible to use the surface of the lid to fix the photovoltaic module 60 for the electricity production for the supply of the circulating pump of the solar circuit accumulation tank 40. The module for preheating water for the house and/or swimming pool water by way of at least one tubular heat exchanger 50 can be integrated into the tank 40. The solar module is another above-standard module according to this invention. This system preferentially uses flat collectors 63 shown in drawing 11 with construction illustrated in drawings 22, 23 and 24. The flat collectors are characterized preferentially as integral metal collecting plates 64 in which a channel system of the appropriately shaped 65a is produced. The distribution system 65b of the channels on the surface of the plates 64 is illustrated in drawings 24a, b and c. The channels are surface-closed by fixing plates or foil 66. The preferential media of collectors and accumulation tank 40 are a water mixture and non-freezing additive and/or refrigerant. Influx and return tubing 67 empties into a distribution channel 68. Heat collected by collectors is transferred by heat transfer media to accumulation tanks 40 and can also influence the temperature of the refrigerant vapor, which is aspirated by at least one compressor 37 of the equipment. Hot refrigerant vapor exits out of tubing 44 from the compressor 37 and moves to the heated house taking the shortest path by way of heat-insulated tubing. Refrigerant vapor is divided in distributing manifolds 71 shown in drawing 21 and in this case exits out by way of tubing 69 shown in drawing 10 into a direct condensation heating system of the house. The system preferentially consists of condensation belts 70, which are located in the peripheral walls. The construction of the condensation belts is evident according to drawing 12. The preferential option is 12b foil. Option 12e is possible as well with a similar heat transfer plate 64 to the solar collector 63 construction. It is also possible to place the condensation plates and/or belts 70 on the ceiling and/or incorporate them into the floor. They are fixed onto a smooth wall by gluing and/or mechanically at the rim. There is also a thin plate of insulating material 82 under the belts and/or plates on the wall 83 shown in drawing 26b. A special flexible cement, which is stiffened by facade reinforced network, is pulled over the belts surface. The final surface consists of selected patent plaster. The temperature of the surface belts in operation does not exceed 90° C. and with respect to the cement material used there is no threat of contact burns. It is not necessary to reduce the temperature of gases exiting out of the compressor 37 front-ended by a heat exchanger. The arrows 32a, b, c and d in drawing 10 illustrate the possible direction of the flowing pressure media in the condensation heating belt. The preferential direction is vertical 32c. Condensed medium flows through tubing 69 by way of collecting manifolds 73 shown in drawing 21 by return tubing 74 to collecting tank 42 or 42 in 41 where the heat is transferred to the colder refrigerant gas aspirated by the compressor 37 illustrated in drawing 16. Liquid refrigerant is further compressed through tubing 75 by way of a dehydrator 76 shown in drawing 21 and then through an electromagnetic valve 77 into at least one throttling element 78 of a valve or nozzle type, which again frees the refrigerant into the vapor spaces of the belts and/or plates 20. The entire system is controlled by automatic regulation. There are no protective elements drawn in the circuit in drawing 21.

Example 2 differs from example 1 in the system supplementation of a module for the production of electricity. Production is secured by a thermoelectric generator shown in drawing 27. This electric generator can be supplemented by photovoltaic production of electricity module 80 and/or an alternate generator. Photovoltaic modules are illustrated in drawing 16 position 60 and in drawing 1 position 7. The electricity production takes place in the thermoelectric belts 79i by utilizing heat energy of condensers and/or evaporators of cooling equipment. Heat energy is generated by systematic operation of a cooling circuit of the system. Individual thermoelectric belts 79 are found in respective constructional plate and/or belt evaporators 99 and condensers 100 shown in drawing 19 and according to drawings 12c, d and f. They are also illustrated in drawing 26; option 26a illustrates the process of heat energy collection by medium, in this case a refrigerant, which develops a lower temperature T2 on thermoelectric belt 79. A higher temperature T1 is secured by the temperature of the environment from which energy is collected, which in this case soil or solar media 2 is shown in drawing 26c. The process can be broadened generally to include cooling systems where the surrounding environment can remain air, water, liquids, solar radiation and so on. Option 26c is therefore collecting option 26a broadened by the induction of solar media 2 on the bottom collecting surface. Temperature T1 is secured in this way. Drawing 26*b* shows the heating process; in this case example b shows condensation, in which the thermoelectric belt 79 is on insulation pad 82, which is found on the constructional wall of room 83. Wall 83 secures the cooler T2 temperature on the surface of belt 79 and the hot gases of the refrigerant secure higher temperature T1. Drawing 26*d* shows the location of thermoelectric belt 79 in solar collectors according to this invention. Solar medium that flows within the collecting plate 64 secures the cooler temperature T2. The solar radiation impinging on the dark belt 79 secures the higher temperature T1. Drawing 26*e* shows the possibility of locating a thermoelectric belt 79 on the surface of accumulation tank 40 and/or boiler 4. The process of utilizing the energy of condensers and/or evaporators of cooling equipment is also illustrated in drawings 19 and 21 where there is direct utilization of these energies. Drawing 20 in 20*b* of this example 2 shows the composition of P-N semiconductors of thermoelectric belts 79 from drawing 21 and the direction of the passage of generated current flow of individual pillars in cells 79*a*. The entire electric generator shown in drawing 27 is comprised of belts 79, conductors 85, control equipment 84 for a change in polarity in the course of an exchange in temperature T$1$<T$2$; it is further comprised of voltage regulator 86, accumulator 87, protection against discharge 88, monitor for generator functioning 90, the possibility of motor (refrigerant compressor of the apparatus) wiring 89 onto produced direct current, measuring 91 of necessary temperatures with sensors 91*a, b, c*, . . . as well as the possibility of motor (refrigerant compressor of the apparatus) wiring 92 onto produced alternating current and/or connection onto a distribution network 93.

The third example of the design differs from example 1 in the indirect manner of collecting low-potential heat and in the indirect manner of transferring produced heat. The indirect manner is the characteristic setting of the heat exchanger 94 of the evaporator and/or 95 of the condenser seen in drawings 17 and 18. These kinds of heat exchangers are most often either of a soldered plate construction or of the tube within a tube type. The forced circulation of primary and secondary media by using electric supply is characteristic. It is possible to include air fan supply to this category as well. Heat transfer media are most often mixtures of water and additives or air. In this example the media consists of mixtures of water and additives. The fact that the cooling circuit with compressor 37 is of a low range is considered an advantage. It is located inside the house in the equipment casing 23 and/or in this case preferentially in the outside skeleton of the equipment 2 on a supporting plate 53 according to drawing 16. In such an embodied plate 53 there is also an evaporator 94 and a condenser 95. Other fittings of the outdoor skeleton and accumulation tank 40, at least one integrated heat exchanger 50 and heat exchange of warm refrigerant to cold refrigerant does not differ any further from the designs described in examples 1 and 2. There is a photovoltaic module 60 for supplying the circulating pump for the circulation of solar media to the accumulation tank 40 and collectors 63 illustrated in drawing 11 and 6 in drawing 1. The system of heat soil collection utilizes the ground air exchanger. The collection system differs from examples 1 and 2 in the design of the collection plates 20, which are made of plastic in this case and its construction is illustrated in drawing 12*a*. The profile of the chamber is preferentially simple and rectangular according to drawing 28 option 97*f*. The plates 20 are connected to the distributing manifold and collecting manifold, which are not illustrated in the drawing, found inside or outside the skeleton 21 by way of influx and return tubing 96 in drawing 18 or 31 in drawing 13. The heat transfer medium transfers the produced heat from the condenser 95 to the heated house, which has a tubular heat system for the floors, walls, ceiling, bodies and/or convector-type for mixtures of water and non-freezing additives. Protective elements are not illustrated in the cooling circuit in drawing 18. The entire system is controlled by automatic regulation.

Example 4 differs from example 3 in the electricity production and plate 70 heat system. This is secured by a generator according to drawing 27 that is diversified by photovoltaic electricity production by modules 80, 60 and 7 and/or a water generator, water turbine. The electricity production takes place in thermoelectric belts 79 illustrated in drawings 17 and 18 while utilizing heat energy of the evaporator and condenser of cooling equipment. Heat energy is developed by the systematic operation of a cooling circuit system, which the circuit this case transfers to mixtures of water and non-freezing additives in this case. This includes the medium illustrated in drawings 26*a*, 26 *b* and medium 1 in drawing 26*c*. Drawing 26*d* illustrates the location of thermoelectric belt 79 in solar collectors. The solar medium flowing within the collecting plate 64 of the solar collector secures the cooler temperature T2. The solar radiation impinging on a dark belt 79 secures the higher temperature T1. Drawing 26*e* illustrates the location of thermoelectric belts 79 on the surface of the accumulation tank 40 and/or boiler 4. The process of utilizing the energy of evaporator and condensers of cooling equipment is also illustrated in drawings 17 and 18 for indirect utilization. Drawing 20 shows the composition of P-N semiconductors of belts 79 and the direction of the passage of generated current flow of individual pillars in cells 79*a*. The entire electric generator shown in drawing 27 is comprised of belts 79$_i$, conductors 85, control equipment 84 for a change in polarity in the course of an exchange in temperature T$1$<T$2$; it is further comprised of voltage regulator 86 accumulator 87 protection against discharge 88, monitor for generator functioning 90, the possibility of motor (compressor) wiring 89 onto direct current, measuring 91 of necessary temperatures with sensors 91*a, b, c*, . . . as well as the possibility of motor (compressor) wiring 92 onto alternating current and/or connection onto a distribution network 93.

The example 5 differs from example 3 in the fact that the entire right half P in drawing 17 in example 3 has been replaced by the right half of P in drawing 19 in example 1. As a result a crossed system was developed consisting of plate collection of soil heat by way of plastic chamber plates 20 according to drawing 12*a* with circulating medium based on water and non-freezing additives. To the right of at least one compressor 37 there is a heat system inside the house of a direct condensation nature with heat plates and/or belts 70 with a pressure medium based on CFC-free refrigerant according to the design of example 1. In this case it is possible to utilize tubular collectors on the side for collecting geothermic heat and/or underground water energy.

The example 6 differs from the design of example 5 only in the expansion of the apparatus by the electricity production by way of belts 22, and generator illustrated in drawing 27. Individual design and location of thermoelectric belts 79 are the same as in the design of example 4 on the collector side and on the condensation heated side of the design of example 2.

The example 7 differs from the design of example 3 in the fact that the entire left half L in drawing 17 in example 3 has been replaced by the left half of L in drawing 19 in example 1. As a result a crossed system was developed consisting of a belt and/or plate direct collection of soil heat by way of evaporating belts and/or plates 20 with medium based on CFC-free refrigerants. To the right of compressor 37 there is an indirect warm water heating system with forced circulation of media based on water and non-freezing additives according to the design of example 3. A condenser in the plate design or of a tube within a tube type position 95 in drawing 17 is preferentially located in the inside skeleton on plate 53 in drawing 16.

The example 8 differs from the design of example 7 only in the expansion of equipment for the electricity production by way of the generator illustrated in drawing 27. Individual design and the location of belts 79, are the same as in the design of example 2 on the collecting evaporating side and of example 4 on the heated side.

INDUSTRIAL APPLICABILITY

The system of plate and belt collectors and/or condensers with modular energetic apparatus for heating, cooling and hot water production according to this invention can be applied to most homes, apartments, industrial and agricultural buildings and other locations.

The thermoelectric module for electricity production can be supplemented by electricity produced by other alternative sources, for example by photovoltaic panels or an alternate generator(s). The thermoelectric method of producing electricity according to this invention is applicable with most heating and/or cooling equipments.

A prerequisite is the adjustment of condensing and/or evaporating surfaces for the location of thermoelectric cells and the selection of thermoelectric material. The produced electricity is preferentially used for supplying at least one refrigerant compressor if realized, various types of light, other electric parts of the system and/or other appliances. The application of electricity produced by this apparatus which is based on the utilization of the system energies of condensers and/or evaporators can be used for own hybrid supply. The production of electricity according to this introduced invention can be implemented in a heat pumps, various heat pumping circuits, heat cycles and heat engines, various heating systems, for household heating and/or cooling, the use of the electricity consumption lowering for the supply of compressors, circulation pumps, ventilators; also in the case of refrigerators, freezers, refrigerated show cabinets, the electricity supply of compressors and/or light, light of spaces, light of an advertisement, brandnames, trademarks, light bulbs, light tubes; lamps, another types of light, the electricity supply of air-conditioners and their electric parts, etc. All things considered it represents big savings in electricity consumption. Some states spend money about of the national energy budgets on refrigeration and cooling and heating, so there are a great electricity savings to be gained here.

The modular energetic apparatus according to this invention serves as integral compact equipment for low-cost heating and/or cooling of residential premises and other locations. This solution is helping to reduce dependency on fossil fuels. At the same time, it contributes to lowering of the pollutants contained in burning fuels.

LIST OF CORRELATED SYMBOLS

1—house
2—outdoor equipment
3—soil trench
4—boiler
5—exchanger—tank on the facade
6—solar collector
7—solar collector with photovoltaic module
8—control mechanism
9—air distribution system
10—ventilation hole
11—air tubing
12—exchange filter
13—exhaled and aspirated air
14—distributing and collecting manifold
14a—entire manifold of soil-air exchanger
15—sector of tubing
16—distributing and collecting manifold of soil-air exchanger
17—tubing for condensate
18—condensate infiltration
19—shoulder of the soil-air exchanger
20—collecting bodies, belts and/or plates
21—bottom part of skeleton
22—gaps with exchange filters
23—interior equipment
24—trencher
25—frost line
26—influx tubing
27—manifold
28—tubing
29—tubing
30—infiltration
31—tubing or conductors
32a—horizontal flow
32b—oblique flow
32c—vertical flow
32d—radius flow
33—metal foil
34—channel layer
35—connecting layer
36—covering layer
37—compressor
38—collecting manifold
39—distributing manifold
40—tank
41—tank
42—tank
43—suction tubing of the compressor
44—outlet tubing of the compressor
45—grid
46—space
47—tank cladding
48—insulation than of the surrounding soil
49—lid
50—tubular exchanger
50a—cladding
51—expansion bag
52—safety valve
53—supporting plate
54—tank contents
55—sealing
56 lid
57—insulation
58—screw fittings
59—angular profile of skeleton and lid
60—module for the production of electricity
61—circular profile of skeleton and lid
62—photovoltaic cells
63—flat collector
64—collection plate
65—channel
65a—shape of channel
65b—distribution system of channels
66—connecting layer 67—tubing
68—distributing and collecting manifold channel
69—influx and return tubing
70—condensation belt and/or plate
71—distributing manifold
72—borehole
73—collecting manifold
74—return tubing
75—tubing
76—dehydrator
77—elektromagnetic valve
78—throttling element
79—thermoelectric belt
$79_i$—thermoelectric belts, foils
$79a$—thermoelectric cell
80—photovoltaic modules
81—alternate generator, wind gen., water gen., etc.
82—insulation pad
83—wall
84—combining equipment
85—conducters
86—voltage regulator
87—accumulator
88—protection against discharge
89—motor for direct current (compressor)
90—monitor functioning
91—temperatures measuring
$91a, b, c,$—temperature sensors
92—motor for alternating current (compressor)
93—distribution network
94—belt construction of heat exchanger
95—plate construction of heat exchanger
96—influx and return tubing
97—profile of channel
$97a,b,e,d,e,f,g,h$—profiles of channel
98—trench axis
99—evaporator
100—condenser
101—structure, body for influx of solar heat
102—soil
103—matter with better heat conductivity
104—refridgerant heat exchange equipment
105—contact surface of thermoelectric belt
106—contact surface of thermoelectric belt
107—case
108—reeled belts
T1—temperature
T2—temperature
Q—heat energy, power, flux
Q1—heat energy, power, flux
Q2—heat energy, power, flux

The invention claimed is:

1. A system for collecting and delivering solar and geothermal heat energy comprises a heat pump with a heat energy support from a solar collector, external air and from rain water is characterized in that, that for improving heat exchange efficiency, a value of coefficients of performance, an ability to work as energy independent and for a reciprocal construction the system is comprised of the following optional modules: a module of geothermal heat collection where at least one collecting body of a belt construction, and/or a plate construction, with connection of influx and return tubing is installed in an exterior of an house in soil trench, and/or in a surrounding soil, and in case of more than one soil trench is realized, the layout of trench axes of these trenches is radial, and/or parallel, and/or trapezoidal, and/or at least one collecting body or collector with an evaporator is installed in a water, and/or in a groundhole, on the primary side of an heat pump for reaching minimal volume of extracted soil, a small area of application and for a reduction in groundwork; a module of heat delivery, where at least one heat delivering body of a belt construction, and/or a plate construction, with connection of influx and return tubing is installed in an interior of an object on a surface of a walls, and/or ceilings, and/or floors, and/or within a construction site under a surfaces for sayings of a place inside an object, and where the flat heat delivering body and the flat heat collecting body may take various shape and contain at least one chamber or a channel with a profile, in the shape of a circle, and/or semicircle, and/or triangle, and/or square, and/or multi-angular, and/or rectangular, and/or compound, and/or oval, through which a heat transfer medium can flows horizontally, and/or obliquely, and/or vertically, and/or radially, and if there is more than one independent and/or independent combined channel and/or a chamber, the circulation of more than one heat transfer medium is possible, and the possible heat transfer media utilizable in the system are an refrigerants, mixture of refrigerants, water, mixture of water and non-freezing additives, air, gas, mixture of gases: a module of at least one heat pump generator with refrigerant components as at least one outdoor and/or indoor compressor, dehydrator, at least one throttling element of a valve or a nozzle type, where an indoor heat pump generator is located inside an object, and/or an outdoor heat pump generator is located outside an object and comprises an outdoor skeleton, with a supporting plate, that can be removed with at least one compressor and with refrigerant components as one part for basic checks and/or for factory or workshop servicing, and/or for reaching a thermally insulated tank, and/or a bottom art of the skeleton and/or a groundhole; a module for a controlled ventilation of a house or an object, and/or for heat energy collection from aspirated and/or from exhaled interior and/or outside air, where at least one shoulder of an air heat exchanger is installed in at least one trench and/or in heat source surroundings, for energetic support of heat collection in heating season and/or for improvement of a cooling function in summer time or in hot climate when fresh outside air is aspirated; a module for a buried irrigation of collecting bodies, and/or an air heat exchanger, with collected water from a tank on a facade, and/or from a buried insulated tank through perforated tubing, for energetic support and heat energy collection from water, which is installed in at least one trench and/or in heat source surroundings; a module of an outside buried heat energy accumulation tank within a skeleton, for easy servicing and reaching from the Earth's surface, and for weather-resistant placement, where a tank contains at least one tubular heat exchanger, an expansion bag, at least one refrigerant heat exchange equipment, and/or the tank contains at least one cladding; a module of at least one refrigerant heat exchange equipment for a mutual transfer of heat of warm refrigerant to refrigerant aspirated by at least one compressor, in construction an heat exchanger of tank within a tank, and/or a tube within and/or around a tube, and/or tubing within and/or around a tank, and/or tubing within and/or around a compressor, and the aspirated refrigerant is in heat contact with an heat from a fluid of a tank, and/or from a fluid of a tubing; a module for a preheating of warm water in order to supply an object, and/or a pool water in an outside accumulation tank by solar heat, and/or by heat produced by at least one compressor for savings of a place inside an object; a solar module(s) with higher heat exchange efficiency thanks to an accumulation plate construction of a solar collectors, and/or a photovoltaic-solar collectors with a photovoltaic cells or a photovoltaic layer, and with a possibility of diversification of thermoelectric belts or layers on a plate construction of the plate based collectors, for a production of electricity on photovoltaic and/or thermoelectric energy conversion effect, and the solar module(s) for a collecting of solar radiation by collectors with a circulation of at least one heat transfer medium as a refrigerant, mixture of refrigerants, water, mixture of water and non-freezing additives, air, gas, mixture of gases, and where an integral or divided collecting plates are made of metal or of metal alloy, and/or of plastics, and/or of a mixture of plastic materials, with a distribution system of a channels, with a channels having a semi-circular, and/or circular, and/or oval, and/or triangular, and/or square, and/or rectangular, and/or multi-angular, and/or compound shape, and where a heat transfer medium cools the collecting plates and therefore improves and maintains the conditions for the activity of photovoltaic and/or thermoelectric cell(s) and/or layer(s) in summertime or in a hot climate; a module of thermoelectric generator for a production of electric power for an independent electric power supply to at least one electric-power powered compressor, a control equipment and/or other electric motors or parts of the system, and/or for an electric power supply through one-way or two-way connection to a distribution network and/or to an electrical appliances, and the electric power from thermoelectric generator is generated in at least one thermoelectric cell of at least one thermoelectric belt and/or in a thermoelectric layer on a basis of temperatures differences $T1_i$-$T2_i$ both surfaces of belts and/or layers, and heat energies in at least one condenser and/or in at least one evaporator of working circuit of an electrical compressor heat pump are used for heating and/or for cooling, and also for a temperature action to the production of electricity based on thermoelectric conversion effects, where by a working circuits of an electrical compressor heat pumps and domestic and industrial refrigerating machinery are used as low-potential heat sources a heat energies accumulated in a solids, fluids, waste fluids, gases, by environmentally aware a n-combustible and non-polluting heat energies accumulated in Earth's surface, in soil, underground water, surface water, rain water, air, waste air, sunshine.

2. A system for collecting and delivering solar and geothermal heat energy according to claim 1, wherein the essential heat collecting bodies and the heat transfer bodies of the belt construction and the plate construction are produced of one and/or more layers of metal and/or metal alloy and/or plastics and/or of mixtures of plastics into a preferential rectangular shape, and the bodies may take also various shape and can contain at least one thermoelectric belt and/or thermoelectric layer, and/or at least one body for an influx of heat from a solar collectors, and/or for an influx of an air and/or a gaseous medium for energetic support of heat collection and heat delivery.

3. A system for collecting and delivering solar and geothermal heat energy according to claim 1 is characterized in that, wherein there is at least one heat collecting belt body and/or at least one plate body, an air heat exchanger, perforated tubing for an influx of water, which are all surrounded by excavated soil and/or sand, and/or by a solid matter, and/or a fluid matter, and/or a gaseous matter, with better heat conductivity than the surrounding soil, and/or with better heat accumulation and heat capacity, where a matter in a closed case or without a case is lodged in at least one mutual trench.

4. A system for collecting and delivering solar and geothermal heat energy according to claim 3, where at least one trench for the installation of at least one heat collecting body of a belt and/or of a plate construction, and/or an air heat exchanger, and/or an irrigation tubing is characterized in that, the trench or the trenches are advantageously prepared by a trencher with a trench chain or with a trench belt for easier and faster groundwork.

5. A system for collecting and delivering solar and geothermal heat energy according to claim 1, wherein an outdoor heat pump generator has an electricity generating module on a lid of its skeleton, for an advantageous production of electricity with a short wires from the lid, and the module consists of photovoltaic and/or thermoelectric cell(s) and/or layer(s).

6. A system for collecting and delivering solar and geothermal heat energy according to claim 1, wherein a module for controlled ventilation of an object comprises at least one a buried air exchanger, that is connected by the skeleton into a lower distributing and collecting manifold, and/or into a top distributing and collecting manifold, which can contains gaps with an exchange filters, and where an internal volumetric space of a distributing and collecting manifolds and is solved as integrally and independent, and/or as volumetrically divided for one-way and/or for combined aspiration and/or exhalation of interior and/or outside air, for energetic support of heat energy collection and/or for improvement of a cooling function.

7. A system for collecting and delivering solar and geothermal heat energy with thermoelectric generator according to claim 1, wherein a module of electric generator for the production of electricity comprises at least one thermoelectric belt and/or layer, which is in a heat-conducting contact with at least one heat transfer belt body and/or plate body, and/or with at least one heat collecting belt body and/or plate body, and/or with at least one heat collecting plate of solar collectors, and/or with a surface of an outdoor tank, and/or with a surface of tank of an inside boiler, and surfaces of thermoelectric belt(s) and/or of thermoelectric layer(s) have one surface for a transfer of heat of higher temperature T1 and the second surface for a transfer of heat of lower temperature T2, and a first external heat conductive material of contact surfaces and/or is made of an electric non-conducting material, or it is already electrically conducting from a metal and/or a metal alloy, and the module of electric generator comprises an interconnection insulated metal and/or optical conductors, a control equipment with a possibility for polarity changes, with a possibility of interconnecting a photovoltaic module(s) voltage regulator, at least one accumulator for storing produced electricity, a protection against discharge, monitor functioning, at least one a prior direct current electric motor and/or compressor, and/or at least one an alternating current electric motor and/or compressor, and/or a temperatures measurer with sensors, and/or connection to the distribution network.

8. An electric generator module for the production of electricity according to claim 7, wherein the interior of thermoelectric cell(s) and/or thermoelectric belt(s) comprises at least one a p-type element and a n-type element, and/or the interior comprises at least one a p-type element and a n-type element and next cell comprises an other of a p-type element and a n-type element, and/or the interior of a thermoelectric layer(s) contains a positively active material and/or a negatively active material.

9. An electric generator module for the production of electricity according to claim 7, wherein the interior material of thermoelectric cell(s) and/or thermoelectric belt(s) and/or thermoelectric layer(s) contains $(Bi_{1-x},Sb_x)_2Se_3$ for x from 0 to 0.3, and/or $(Bi_{1-x},Sb_x)_2(Te,Se_3)$ for x from 0.003 to 0.3, and/or $YbAl_3$, and/or $CoSb_3$, and/or $AgSbPb_{18}Te_{20}$, and/or the material contains at least one of Bi, Sb, Te, Se, Yb, Al, Au, Co, Ag, Pb, Te, Ge, As, Cu, Hg, Tl, S, Si, Ga, Fe, Ni, Ti, In, Zn, Cd, Pd, Pt, Rh, Ir, Ru, Os, Re, Mo, Mn, Cr, V, Nb, Mg, Sn, Ba, Ca, W, Be, Zr, B, Ta, Ac, Y, Hf, Sc, Ra, Sr, Fr, Cs, Rb, K, Na, Li, Ce, Pr, Nd, Pm, Sm, Eu, Gd, Tb, Dy, Ho, Er, Tm, Yb, Lu, Th, Pa, U, Np, Pu, Am, Cm, Bk, Cf, Es, Fm, Md, No, Lr.

10. A method of heat pumping with an independent electric supply comprising: providing an electrical compressor heat pumping equipment, wherein the heat pumping equipment and/or a heat pump comprises an electrical compressor(s), a throttling element(s), a heating and/or condensing part(s), a cooling and/or evaporator part(s), a tubing connection(s), an electrical interconnection(s), a thermoelectric layer(s) for the production of electric energy on basis of thermoelectric conversion effects for the independent electric supply to the electrical compressor(s), an accumulator(s), a control equipment and/or to other electrical appliance(s).

11. A system for collecting and delivering solar and geothermal heat energy according to claim 2, wherein there is at least one heat collecting belt body and/or at least one plate body, an air heat exchanger, perforated tubing for an influx of water, which are all surrounded by excavated soil and/or sand, and/or by a solid matter, and/or a fluid matter, and/or a gaseous matter, with better heat conductivity than the surrounding soil, and/or with better heat accumulation and heat capacity, where a matter in a closed case or without a case is lodged in at least one mutual trench.

12. A system for collecting and delivering solar and geothermal heat energy according to claim 11 where at least one trench for the installation of at least one heat collecting body of a belt and/or of a plate construction, and/or an air heat exchanger, and/or an irrigation tubing is characterized in that, the trench or the trenches are advantageously prepared by a trencher with a trench chain or with a trench belt for easier and faster groundwork.

13. A system for collecting and delivering solar and geothermal heat energy according to claim 2, wherein a module for controlled ventilation of an object comprises at least one a buried air exchanger, that is connected by the skeleton into a lower distributing and collecting manifold, and/or into a top distributing and collecting manifold, which can contains gaps with an exchange filters, and where an internal volumetric space of a distributing and collecting manifolds and is solved as integrally and independent, and/or as volumetrically divided for one-way and/or for combined aspiration and/or exhalation of interior and/or outside air, for energetic support of heat energy collection and/or for improvement of a cooling function.

14. A system for collecting and delivering solar and geothermal heat energy with thermoelectric generator according to claim 2, wherein a module of electric generator for the production of electricity comprises at least one thermoelectric belt and/or layer, which is in a heat-conducting contact with at least one heat transfer belt body and/or plate body, and/or with at least one heat collecting belt body and/or plate body, and/or with at least one heat collecting plate of solar collectors, and/or with a surface of an outdoor tank, and/or with a surface of tank of an inside boiler, and surfaces of thermoelectric belt(s) and/or of thermoelectric layer(s) have one surface for a transfer of heat of higher temperature T1 and the second surface for a transfer of heat of lower temperature T2, and a first external heat conductive material of contact surfaces and/or is made of an electric non-conducting material, or it is already electrically conducting from a metal and/or a metal alloy, and the module of electric generator comprises an interconnection insulated metal and/or optical conductors, a control equipment with a possibility for polarity changes, with a possibility of interconnecting a photovoltaic module(s), voltage regulator, at least one accumulator for storing produced electricity, a protection against discharge, monitor functioning at least one a prior direct current electric motor and/or compressor, and/or at least one an alternating current electric motor and/or compressor, and/or a temperatures measurer with sensors, and/or connection to the distribution network.

15. A system for collecting and delivering solar and geothermal heat energy with thermoelectric generator according to claim 5, wherein a module of electric generator for the production of electricity comprises at least one thermoelectric belt and/or layer, Which is in a heat-conducting contact with at least one heat transfer belt body and/or plate body, and/or with at least one heat collecting belt body and/or plate body, and/or with at least one heat collecting plate of solar collectors, and/or with a surface of an outdoor tank, and/or with a surface of tank of an inside, boiler, and surfaces of thermoelectric belt(s) and/or of thermoelectric layer(s) have one surface for a transfer of heat of higher temperature T1 and the second surface for a transfer of heat of lower temperature T2, and a first external heat conductive material of contact surfaces and/or is made of an electric non-conducting material, or it is already electrically conducting from a metal and/or a metal alloy, and the module of electric generator comprises an interconnection insulated metal and/or optical conductors, a control equipment with a possibility for polarity changes, with a possibility of interconnecting a photovoltaic module(s), voltage regulator, at least one accumulator for storing produced electricity, a protection against discharge, monitor functioning, at least one a prior direct current electric motor and/or compressor, and/or at least one an alternating current electric motor and/or compressor, and/or a temperatures measurer with sensors, and/or connection to the distribution network.

16. An electric generator module for the production of electricity according to claim 14, wherein the interior of thermoelectric cell(s) and/or thermoelectric belt(s) comprises at least one a p-type element and a n-type element, and/or the interior comprises at least one a p-type element and a n-type element and next cell comprises an other of a p-type element and a n-type element, and/or the interior of a thermoelectric layer(s) contains a positively active material and/or a negatively active material.

17. An electric generator module for the production of electricity according to claim 15, wherein the interior of thermoelectric cell(s) and/or thermoelectric belt(s) comprises at least one a p-type element and a n-type element, and/or the interior comprises at least one a p-type element and a n-type element and next cell comprises an other of a p-type element and a n-type element, and/or the interior of a thermoelectric layer(s) contains a positively active material and/or a negatively active material.

18. An electric generator module for the production of electricity according to claim 14, wherein the interior material of thermoelectric cell(s) and/or thermoelectric belt(s) and/or thermoelectric layer(s) contains $(Bi_{1-x},Sb_x)_2Se_3$ for x from 0 to 0.3, and/or $(Bi_{1-x},Sb_x)_2(Te,Se_3)$ for x from 0.003 to 0.3, and/or $YbAl_3$, and/or $CoSb_3$, and/or $AgSbPb_{18}Te_{20}$, and/or the material contains at least one of Bi, Sb, Te, Se, Yb, Al, Au, Co, Ag, Pb, Te, Ge, As, Cu, Hg, Tl, S, Si, Ga, Fe, Ni, Ti, In, Zn, Cd, Pd, Pt, Rh, Ir, Ru, Os, Re, Mo, Mn, Cr, V, Nb, Mg, Sn, Ba, Ca, W, Be, Zr, B, Ta, Ac, Y, Hf, Sc, Ra, Sr, Fr, Cs, Rb, K, Na, Li, Ce, Pr, Nd, Pm, Sm, Eu, Gd, Tb, Dy, Ho, Er, Tm, Yb, Lu, Th, Pa, U, Np, Pu, Am, Cm, Bk, Cf, Es, Fm, Md, No, Lr.

19. An electric generator module for the production of electricity according to claim 15, wherein the interior material of thermoelectric cell(s) and/or thermoelectric belt(s) and/or thermoelectric layer(s) contains $(Bi_{1-x},Sb_x)_2Se_3$ for x from 0 to 0.3, and/or $(Bi_{1-x},Sb_x)_2(Te,Se_3)$ for x from 0.003 to 0.3, and/or $YbAl_3$, and/or $CoSb_3$, and/or $AgSbPb_{18}Te_{20}$, and/or the material contains at least one of Bi, Sb, Te, Se, Yb, Al, Au, Co, Ag, Pb, Te, Ge, As, Cu, Hg, Tl, S, Si, Ga, Fe, Ni, Ti, In, Zn, Cd, Pd, Pt, Rh, Ir, Ru, Os, Re, Mo, Mn, Cr, V, Nb, Mg, Sn, Ba, Ca, W, Be, Zr, B, Ta, Ac, Y, Hf, Sc, Ra, Sr, Fr, Cs, Rb, K, Na, Li, Ce, Pr, Nd, Pm, Sm, Eu, Gd, Tb, Dy, Ho, Er, Tm, Yb, Lu, Th, Pa, U, Np, Pu, Am, Cm, Bk, Cf, Es, Fm, Md, No, Lr.

20. An electric generator module for the production of electricity according to claim 16, wherein the interior material of thermoelectric cell(s) and/or thermoelectric belt(s) and/or thermoelectric layer(s) contains $(Bi_{1-x},Sb_x)_2Se_3$ for x from 0 to 0.3, and/or $(Bi_{1-x},Sb_x)_2(Te,Se_3)$ for x from 0.003 to 0.3, and/or $YbAl_3$, and/or $CoSb_3$, and/or $AgSbPb_{18}Te_{20}$, and/or the material contains at least one of Bi, Sb, Te, Se, Yb, Al, Au, Co, Ag, Pb, Te, Ge, As, Cu, Hg, Tl, S, Si, Ga, Fe, Ni, Ti, In, Zn, Cd, Pd, Pt, Rh, Ir, Ru, Os, Re, Mo, Mn, Cr, V, Nb, Mg, Sn, Ba, Ca, W, Be, Zr, B, Ta, Ac, Y, Hf, Sc, Ra, Sr, Fr, Cs, Rb, K, Na, Li, Ce, Pr, Nd, Pm, Sm, Eu, Gd, Tb, Dy, Ho, Er, Tm, Yb, Lu, Th, Pa, U, Np, Pu, Am, Cm, Bk, Cf, Es, Fm, Md, No, Lr.

21. An electric generator module for the production of electricity according to claim 17, wherein the interior material of thermoelectric cell(s) and/or thermoelectric belt(s) and/or thermoelectric layer(s) contains $(Bi_{1-x},Sb_x)_2Se_3$ for x from 0 to 0.3, and/or $(Bi_{1-x},Sb_x)_2(Te,Se_3)$ for x from 0.003 to 0.3, and/or $YbAl_3$, and/or $CoSb_3$, and/or $AgSbPb_{18}Te_{20}$, and/or the material contains at least one of Bi, Sb, Te, Se, Yb, Al, Au, Co, Ag, Pb, Te, Ge, As, Cu, Hg, Tl, S, Si, Ga, Fe, Ni, Ti, In, Zn, Cd, Pd, Pt, Rh, Ir, Ru, Os, Re, Mo, Mn, Cr, V, Nb, Mg, Sn, Ba, Ca, W, Be, Zr, B, Ta, Ac, Y, Hf, Sc, Ra, Sr, Fr, Cs, Rb, K, Na, Li, Ce, Pr, Nd, Pm, Sm, Eu, Gd, Tb, Dy, Ho, Er, Tm, Yb, Lu, Th, Pa, U, Np, Pu, Am, Cm, Bk, Cf, Es, Fm, Md, No, Lr.

* * * * *

UNITED STATES PATENT AND TRADEMARK OFFICE
CERTIFICATE OF CORRECTION

PATENT NO. : 8,286,441 B2
APPLICATION NO. : 12/375905
DATED : October 16, 2012
INVENTOR(S) : Pavel Simka It is certified that error appears in the above-identified patent and that said Letters Patent is hereby corrected as shown below:

In the Specifications:

In the column 35, line 11, the text "77-elektromagnetic valve" should be changed to --77-electromagnetic valve--.

In the column 35, line 42, the text "104-refridgerant heat exchange equipment" should be changed to --104-refrigerant heat exchange equipment--.

In the Claims:

In the column 36, line 8, claim 1, the text of line "construction site under a surfaces for sayings of a place inside" should be changed to --construction site under a surfaces for savings of a place inside--.

In the column 36, line 21, claim 1, the text of line "and non-freezing additives, air, gas, mixture of gases: a mod-" should be changed to --and non-freezing additives, air, gas, mixture of gases; a mod- --.

In the column 36, line 31, claim 1, the text of line "for reaching a thermally insulated tank, and/or a bottom art of" should be changed to --for reaching a thermally insulated tank, and/or a bottom part of--.

In the column 36, line 58, claim 1, the text of line "contact with an heat from a fluid of a tank, and/or from a fluid" should be changed to --contact with a heat from a fluid of a tank, and/or from a fluid--.

In the column 37, line 38, claim 1, the text of line "mentally aware a n-combustible and non-polluting heat ener-" should be changed to --mentally aware a non-combustible and non-polluting heat ener- --.

In the column 38, line 37, claim 7, the text of line "faces and/or is made of an electric non-conducting material," should be changed to --faces is made of an electric non-conducting material,--.

Signed and Sealed this
Twenty-first Day of May, 2013

Teresa Stanek Rea
*Acting Director of the United States Patent and Trademark Office*

CERTIFICATE OF CORRECTION (continued)
U.S. Pat. No. 8,286,441 B2

In the column 39, line 60, claim 14, the text of line "surfaces and/or is made of an electric non-conducting mate-" should be changed to --surfaces is made of an electric non-conducting mate- --.

In the column 40, line 10, claim 15, the text "tric belt and/or layer, Which is in a heat-conducting contact" should be changed to --tric belt and/or layer, which is in a heat-conducting contact--.

In the column 40, line 15, claim 15, the text "with a surface of tank of an inside, boiler, and surfaces of" should be changed to --with a surface of tank of an inside boiler, and surfaces of--.